(12) United States Patent
Tsiberidis

(10) Patent No.: US 11,565,555 B2
(45) Date of Patent: Jan. 31, 2023

(54) COMPRESSOR ASSEMBLY HAVING A MAGNETIC COUPLING

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignees: ILLINOIS TOOL WORKS INC., Glenview, IL (US); KT-PROJEKTENTWICKLUNGS-GMBH, Heilbronn (DE)

( * ) Notice: Subject to any disclaimer, the term of this patent is extended or adjusted under 35 U.S.C. 154(b) by 509 days.

(21) Appl. No.: 16/488,334

(22) PCT Filed: Mar. 5, 2018

(86) PCT No.: PCT/EP2018/055369
§ 371 (c)(1),
(2) Date: Aug. 23, 2019

(87) PCT Pub. No.: WO2018/158466
PCT Pub. Date: Sep. 7, 2018

(65) Prior Publication Data
US 2019/0375253 A1    Dec. 12, 2019

(30) Foreign Application Priority Data

Mar. 3, 2017 (DE) .................... 10 2017 002 083.3
Mar. 29, 2017 (DE) .................... 10 2017 106 805.8

(51) Int. Cl.
*B60C 23/12* (2006.01)
*B60C 23/00* (2006.01)
(Continued)

(52) U.S. Cl.
CPC .......... *B60C 23/127* (2020.05); *B60C 23/004* (2013.01); *B60C 23/137* (2020.05);
(Continued)

(58) Field of Classification Search
CPC ... B60C 23/127; B60C 23/004; B60C 23/137; F04B 35/04; F04B 35/01; F16D 27/06
See application file for complete search history.

(56) References Cited

U.S. PATENT DOCUMENTS 648,408 A   5/1900  Hayes
652,997 A   7/1900  Crandall
(Continued)

FOREIGN PATENT DOCUMENTS

CA   2226493      7/1996
CN   85105176 A  12/1986
(Continued)

OTHER PUBLICATIONS

European Patent Office (EPO), International Search Report, Form PCT/ISA/210 for International Application No. PCT/EP2018/055369 (2 pages).

(Continued)

*Primary Examiner* — Scott A Browne
(74) *Attorney, Agent, or Firm* — Pauley Erickson & Swanson

(57) ABSTRACT

A compressor assembly (10) for supplying pressure medium to a tire cavity (7) of a tire of a vehicle wheel, which can be mounted on a wheel hub (4) that is mounted on a wheel carrier (3) for rotation about an axis of rotation (32). The compressor assembly (10) includes a hub-side compression chamber (16) and a compressor component (18). A pressure medium is conducted into the tire cavity (7) upon being pressurized in the compression chamber (16) by oscillating translational motion of the compressor component (18). The
(Continued)

compressor assembly (10) includes a transmission (20) that converts a rotational motion between the wheel carrier side and the wheel hub side into an oscillating translational motion of the compressor component (18) when a hub-side transmission part (24) is in an operating position with a wheel-carrier-side transmission part (26).

12 Claims, 20 Drawing Sheets

(51) Int. Cl.
 *F04B 35/04* (2006.01)
 *B29L 30/00* (2006.01)
 *F04B 35/01* (2006.01)
 *F16D 27/06* (2006.01)
(52) U.S. Cl.
 CPC .......... *F04B 35/04* (2013.01); *B29L 2030/00* (2013.01); *F04B 35/01* (2013.01); *F16D 27/06* (2013.01)

(56) References Cited

U.S. PATENT DOCUMENTS

| | | | |
|---|---|---|---|
| 655,797 A | 8/1900 | Reason | |
| 797,447 A | 8/1905 | Merry | |
| 1,358,524 A | 11/1920 | Cooper | |
| 1,713,899 A | 5/1929 | Gray | |
| 1,885,284 A * | 11/1932 | Otto | B60C 23/137 152/421 |
| 2,317,636 A * | 4/1943 | Parker | B60C 23/127 152/422 |
| 2,506,677 A | 5/1950 | McKenna | |
| 3,452,801 A * | 7/1969 | Fletcher | B60C 23/137 152/419 |
| 5,052,456 A | 10/1991 | Dosjoub | |
| 5,325,902 A | 7/1994 | Loewe et al. | |
| 5,505,080 A | 4/1996 | McGhee | |
| 5,556,258 A * | 9/1996 | Lange | F04B 33/00 417/63 |
| 5,591,281 A * | 1/1997 | Loewe | F04B 35/00 417/233 |
| 6,345,650 B1 | 2/2002 | Paasch et al. | |
| 6,736,170 B2 | 5/2004 | Eriksen et al. | |
| 6,994,136 B2 | 2/2006 | Stanczak | |
| 7,237,590 B2 | 7/2007 | Loewe | |
| 7,581,576 B2 | 9/2009 | Nakano | |
| 7,760,079 B2 | 7/2010 | Isono | |
| 7,891,393 B1 | 2/2011 | Czarno | |
| 8,052,400 B2 | 11/2011 | Isono | |
| 9,151,288 B2 | 10/2015 | Richardson et al. | |
| 9,457,772 B2 | 10/2016 | Paasch | |
| 2003/0056851 A1 | 3/2003 | Eriksen et al. | |
| 2006/0102268 A1* | 5/2006 | Loewe | B60C 23/004 152/415 |
| 2007/0151648 A1 | 7/2007 | Loewe | |
| 2008/0060734 A1 | 3/2008 | Stehle | |
| 2010/0059143 A1 | 3/2010 | Wang | |
| 2010/0282388 A1 | 11/2010 | Kelly | |
| 2013/0251552 A1 | 9/2013 | Richardson | |
| 2013/0269514 A1 | 10/2013 | Sato et al. | |
| 2014/0096881 A1 | 4/2014 | Loewe | |
| 2015/0101723 A1 | 4/2015 | Keeney et al. | |
| 2015/0191058 A1 | 7/2015 | Van Wyk Becker et al. | |
| 2016/0250902 A1 | 9/2016 | Becker | |
| 2016/0288591 A1* | 10/2016 | Becker | B60C 23/127 |
| 2016/0288592 A1 | 10/2016 | Becker | |
| 2017/0113500 A1 | 4/2017 | Gau et al. | |
| 2019/0023091 A1 | 1/2019 | Spindler et al. | |
| 2019/0308472 A1 | 10/2019 | Tsiberidis | |
| 2019/0366785 A1 | 12/2019 | Tsiberidis | |
| 2020/0055351 A1 | 2/2020 | Tsiberidis | |
| 2020/0070450 A1 | 3/2020 | Tsiberidis | |

FOREIGN PATENT DOCUMENTS

| | | | |
|---|---|---|---|
| CN | 86105562 A | 2/1988 | |
| CN | 2126829 Y | 10/1993 | |
| CN | 2188661 Y | 2/1995 | |
| CN | 2202665 Y | 7/1995 | |
| CN | 2252128 | 4/1997 | |
| CN | 101104374 | 1/2008 | |
| CN | 101120170 A | 2/2008 | |
| CN | 201061989 Y | 5/2008 | |
| CN | 201082666 | 7/2008 | |
| CN | 101312821 A | 11/2008 | |
| CN | 101313162 A | 11/2008 | |
| CN | 101351347 A | 1/2009 | |
| CN | 101696681 | 4/2010 | |
| CN | 202439521 U | 9/2012 | |
| CN | 102781653 A | 11/2012 | |
| CN | 102791954 A | 11/2012 | |
| CN | 103459843 A | 12/2013 | |
| CN | 103465736 A | 12/2013 | |
| CN | 104024007 A | 9/2014 | |
| CN | 104583592 A | 4/2015 | |
| CN | 105264228 A | 1/2016 | |
| CN | 205044451 U | 2/2016 | |
| CN | 105408135 A | 3/2016 | |
| CN | 110573356 A | 12/2019 | |
| CN | 110650852 A | 1/2020 | |
| DE | 40 36 362 A1 | 5/1992 | |
| DE | 41 33 039 A1 | 4/1993 | |
| DE | 10 2005 019 766 A1 | 11/2006 | |
| DE | 102008062071 A1 * | 6/2010 | ........... B60C 23/003 |
| DE | 102010011124 A1 * | 12/2011 | ........... B60C 23/004 |
| DE | 20 2014 010520 U1 | 11/2015 | |
| DE | 10 2015 115642 A1 | 3/2017 | |
| EP | 0166 123 | 1/1986 | |
| EP | 0 588 595 A1 | 3/1994 | |
| EP | 1 881 197 A1 | 1/2008 | |
| EP | 2 828 103 B1 | 1/2015 | |
| FR | 1324352 | 3/1963 | |
| JP | H11139118 A | 5/1999 | |
| JP | 2004-136797 | 5/2004 | |
| JP | 2006-110762 | 4/2006 | |
| JP | 2007-039013 A | 2/2007 | |
| JP | 2007-278796 | 10/2007 | |
| JP | 2009090826 A | 4/2009 | |
| JP | 2012202385 A | 10/2012 | |
| JP | 2012202385 A * | 10/2012 | |
| JP | 2017500238 A | 1/2017 | |
| WO | WO 2008/041423 A1 | 4/2008 | |
| WO | WO 2010/146373 A1 | 12/2010 | |
| WO | WO 2015/063679 A1 | 5/2015 | |
| WO | WO 2015/075655 A1 | 5/2015 | |
| WO | WO 2016/138972 A1 | 9/2016 | |
| WO | WO 2016/178137 A1 | 11/2016 | |
| WO | WO 2018/096108 A1 | 5/2018 | |
| WO | WO 2018/096109 A1 | 5/2018 | |
| WO | WO 2018/096110 A1 | 5/2018 | |
| WO | WO 2018/096111 A1 | 5/2018 | |
| WO | WO 2018/096112 A1 | 5/2018 | |

OTHER PUBLICATIONS

Chongfeng DI, "Research on Characteristic and Control Strategy of Hydraulic Hybrid Vehicle with Hydraulic Common Pressure Rail", China Master Dissertation Full-text Database, Jan. 1, 2016, pp. 27-38 and 78-80.

* cited by examiner

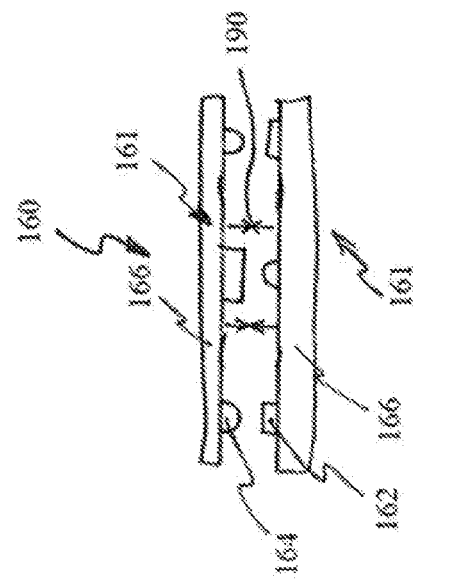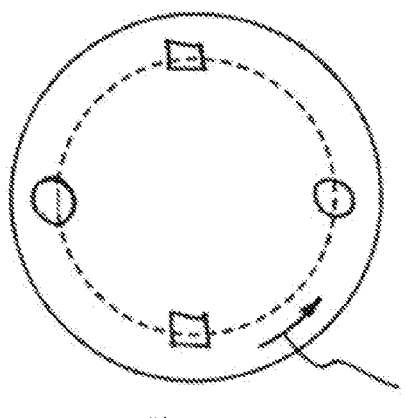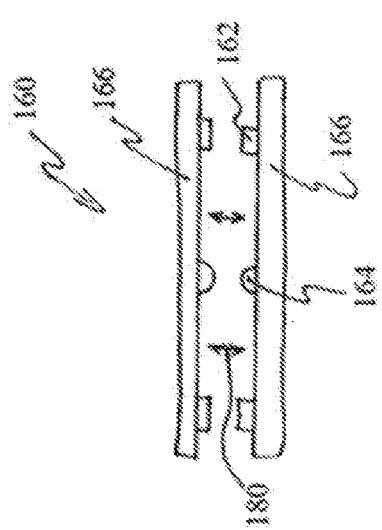
Fig. 20C
Fig. 20B
Fig. 20A

COMPRESSOR ASSEMBLY HAVING A MAGNETIC COUPLING

BACKGROUND OF THE INVENTION

Field of the Invention

The invention relates to a compressor assembly for supplying pressure medium to a tire cavity of a tire of a vehicle wheel, which vehicle wheel can be mounted on a wheel hub, which is mounted on a wheel carrier.

Discussion of Related Art

The tire cavity of the tire is part of a vehicle wheel which can be mounted on a wheel hub, wherein the wheel hub is mounted on a wheel carrier for rotation about an axis of rotation.

To fill a tire cavity of a vehicle tire with a pressure medium, such as compressed air, it is known to provide a tire valve on the vehicle wheel, via which the pressure medium can be introduced into the tire cavity. In the case of vehicles, such as automobiles, trucks or commercial vehicles, tire valves are usually arranged in the region of a rim, upon which the tire is mounted, such that they are easy to access from the outside.

A pressure medium source outside of the vehicle can be connected to the tire valve, for example by means of a hose line, in order to be able to check the tire pressure, in particular manually, and if necessary, correct it.

Further, on-board pressure medium supply systems are known, which allow users to fill the tire cavity of a vehicle wheel with pressure medium autonomously. To this end it is known to provide pressure medium lines from a central, on-board provided pressure medium source, for example a compressor or a pressure reservoir, to the wheels and guide them to the tire cavity. In the transition from components that are rotationally fixed vis-à-vis the vehicle, such as the wheel carrier, to wheels that rotate in drive mode so-called rotary feedthroughs are realized, which make it possible to fill tires with pressure medium while driving, i.e. when the wheels are rotating. In this way the tire pressure can be adapted, e.g., to changed load conditions, road surfaces and ambient temperatures or to compensate for leaks, e.g., via diffusion.

One problem of the known systems is that pressure medium sources outside of the vehicle in each case must be held and the pressure in all of the tire cavities must undergo the time-consuming process of checking and correction. In the case of the known on-board pressure medium sources, which convey pressure medium to the tire cavity via rotary feedthroughs, the operating safety of the rotary feedthroughs for the pressure medium is a problem. Manufacturing the rotary feedthroughs such that they are sufficiently robust and durable that they will last for the service life of a vehicle is only possible with a great deal of effort, which is expensive and uneconomical.

SUMMARY OF THE INVENTION

The current invention addresses the problem of creating a compressor assembly that ensures a filling of the tire cavity with pressure medium reliably and with low maintenance over the service life of the vehicle.

This problem is solved by a compressor assembly including a hub-side compression chamber and a compressor component, wherein a pressure medium to be conducted into the tire cavity is pressurized in the compression chamber by oscillating translational motion of the compressor component, and wherein the compressor assembly includes a transmission, preferably a cam transmission, which is designed to convert a rotational motion between the wheel carrier side and the wheel hub side into an oscillating translational motion of the compressor component when a hub-side transmission part is in an operating position with a wheel-carrier-side transmission part.

If the wheel carrier side transmission part is in an operating position with the hub-side transmission part, the compressor assembly is in operation. The compressor component moves in an oscillating translational manner back and forth between an upper dead center, which constitutes the end of a delivery stroke, and a lower dead center, which constitutes the end of an intake stroke.

If the hub-side transmission part is brought out of the operating position with the wheel carrier side transmission part, the compressor assembly ceases operation. The compressor component is then no longer driven by the rotatory relative movement between wheel hub side and wheel carrier side.

The translational motion of the compressor component occurs preferably either in radial direction or in axial direction. Such compressor assemblies can be designed very compact in the respective other directions, which can be desirable, depending on the installation position. However, it is also possible that the compressor component executes a translational movement which has only one component in radial direction or in axial direction.

The compressor assembly can have several compressor components, in particular when the movement of the compressor components occurs in radial direction. As a result, the delivery rate of the compressor assembly can be increased.

Preferably the compressor assembly is configured to be annular and has several compression chambers arranged distributed in circumferential direction, in which in each case a compressor component is arranged namely such that it can be moved in an oscillating translational motion in radial direction. Advantageously the individual compressor components are designed similar to a piston and have a projection pointing radially inward or radially outward, this projection preferably simultaneously forms the hub-side transmission part. The hub-side transmission part can be brought into an operating position with a curved path, preferably an outer contour or an inner contour of a curved path, which is mounted on the wheel carrier side. In the process, the curved path forms the wheel carrier side transmission part.

In general, the transmission is preferably a cam transmission. In the case of a compressor component that executes a movement in radial direction or with a component in radial direction the wheel carrier side transmission part can be arranged internally, thus it can have a curved path on its outer contour. As an alternative, the wheel carrier side transmission part can be arranged externally, thus it can have a curved path on its inner contour.

If the compressor assembly is configured such that the compressor component moves entirely or predominantly in axial direction, the compressor component can be designed as an annular piston or as an area piston. A design as an annular piston facilitates a compact construction. A design as an annular piston facilitates high delivery rates.

A compressor component moving in axial direction can have a curved path on its side averted from the compression chamber, which forms the hub-side transmission part. The wheel carrier side transmission part can likewise be configured as a curved path. The wheel carrier side transmission part can however also be configured as a tappet drive. A configuration is also conceivable in which the wheel carrier side transmission part has a curved path, or is formed by the same, and the hub-side transmission part is configured as a tappet output.

Preferably is in the contact region between hub-side transmission part and the wheel carrier side transmission part at least one roller is arranged. This roller can be arranged on the hub-side transmission part or on the wheel carrier side transmission part. For example, the hub-side transmission part can be configured as a tappet output in the shape of a roller tappet.

It is advantageous if a pressure medium outlet is arranged in the limitation of the compression chamber, preferably in a cover section limiting the compression chamber, which is connected to a dead space volume of the compression chamber, wherein the pressure medium outlet can be connected to the tire cavity via a line section, preferably in which a check valve is arranged, and wherein the line section is connected to a relief valve, via which the line can be relieved from pressure. In the process, cover section here refers to the region of the wall of the compression chamber, which also limits the compression chamber when the compressor component is located in an upper dead center. In other words, the cover section is the part of the wall of the compression chamber that limits the dead space volume. Through the pressure medium outlet, which is connected to the line section that can be relieved from pressure, the dead space volume of the compression chamber can be used as a pneumatic spring, which moves the compressor component from its position in the upper dead center to initiate the intake stroke. If the compressor component is supposed to remain in the upper dead center, the line section can be relieved from pressure and the pneumatic spring effect is absent. The compressor component can then be held in the position of the upper dead center, for example via centrifugal forces or also via a magnet based decoupling device, which will be covered in detail later.

It is advantageous if a pressure chamber with a pressure medium inlet is provided, wherein the compressor component forms a part of a limitation of the of the pressure chamber such that the compressor component can be moved by supplying a pressure surge to the pressure chamber. Via the pressure medium inlet, pressure medium under pressure from a pressure reservoir, for example the tire cavity, can be supplied to the pressure chamber. As a result, the compressor component can be moved. This can be used, for example, to start the compressor assembly, or to bring the hub-side transmission part in operating position with the wheel carrier side transmission part.

The pressure chamber can be the compression chamber. The pressure medium inlet is then advantageously arranged in the cover section of the limitation of the compression chamber.

Advantageously the pressure chamber can be configured to be pneumatically separate from the compression chamber. The pressure in the pressure chamber is then independent from the pressure in the compression chamber. Preferably the pressure chamber is arranged in the compressor component and/or in the hub-side transmission part.

It should be understood that in general, corresponding seals are provided in the region of the compression chamber. In corresponding embodiments, they are also provided in the region of the pressure chamber.

Advantageously the pressure chamber is sealable. This means that the pressure medium under pressure can be supplied to the pressure chamber via the pressure medium inlet and the pressure chamber can then be sealed pneumatically tight, so that the pressure in the pressure chamber is maintained. This can be implemented for example via a magnetic valve or a differently configured valve, preferably actuable.

The pressure chamber can have the pressure medium inlet, in particular with a valve, and an outlet separate from the inlet, preferably with a separate valve. The pressure medium inlet can however also be configured with a valve, which is configured both to supply a pressure surge to the pressure chamber and to relieve pressure of the pressure chamber.

It is preferred that a rod-type guide element extends in the compressor component. Such a guide element guides the movement of the compressor component and protects it from tipping.

Preferably the pressure medium inlet is arranged on the rod-type guide element. For example, a hollow space can be provided in the compressor component for formation of the pressure chamber. The rod-type guide element can project into this hollow space and simultaneously comprise the pressure medium inlet. The pressure medium inlet can however also, at least in certain areas, run between the compressor component and the guide element, for example in a groove. The pressure chamber is advantageously sealed with respect to the guide element. When the pressure chamber is exposed to pressure the compressor component moves along the guide element, for example from the upper dead center to the lower dead center. If the pressure chamber is closed, the pressure in the pressure chamber decreases during this movement, because its volume increases. If the pressure chamber is closed, the pressure in the pressure chamber builds back up upon the return of the compressor component to the upper dead center. The pressure chamber or the pressure medium under pressure enclosed therein acts as a pneumatic spring. If this spring action is no longer desired, the pressure chamber can be relieved from pressure.

A guide element is especially preferably provided in the case of a compressor component, which is designed for a movement in radial direction.

It is advantageous if at least two, rod-type or other guide elements extend in the compressor component. The guide elements thus form an anti-locking device for the compressor component and ensure a secure guiding of the compressor component, wherein a tipping of the compressor component is precluded.

It is advantageous if a line section runs in the rod-type guide element, which flows into the pressure medium inlet. The pressure chamber can thus be simply supplied with pressure medium. The guide element can be simply manufactured, for example as a hollow bored pin.

Preferably the guide element forms a part of the limitation of the pressure chamber.

It is also advantageous if the guide element is an anti-locking device for the compressor component, preferably wherein the guide element has an out of round, in particular oval cross-section. The compressor component is then not only guided by the guide element and prevented from tipping, but also prevented from turning.

In one preferred embodiment the compressor assembly comprises a magnet based decoupling device, via which the hub-side transmission part can be held out of the operating position with the wheel carrier side transmission part and/or can be brought out of the operating position with the wheel carrier side transmission part. To this end the decoupling device can contain a switchable magnet assembly. One example of such a switchable magnet assembly is, for example, an electromagnet. Such an electromagnet can in the process be configured such that it is magnetic upon energization. Alternatively, to this end it can also be configured such that it is demagnetized upon energization. A switchable magnet assembly can also be configured such that a formation of permanent magnets can, by means of a movement, e.g., a twisting, be brought from an attractive effect to a repellent effect with respect to a second formation of permanent magnets or vice versa. For example, four permanent magnets can be arranged in an annular formation, wherein the permanent magnets are in each case alternately aligned with respect to their polarity. A second formation of permanent magnets can be correspondingly configured.

If the permanent magnets of the two formations face each other such that in each case homopolar magnets are facing each other, the magnet assemblies repel each other. If one of the two magnet formations, e.g., is turned by 90°, in each case magnets with differing polarities are facing each other and the two magnet formations attract each other. Other types of magnet formations are also conceivable. For example, permanent magnets of differing polarity can be arranged in a row and be switchable between repelling and attracting by means of translational movement with respect to a second magnet formation of permanent magnets arranged in a row.

In general, a switchable magnet assembly is to be understood as a device in which magnetic force can be switched between repellent and attracting or between repellent and neutral or between attracting and neutral.

In the above described designs of the switchable magnet assembly with two magnet formations a first magnet formation can be arranged on the compressor component and a second magnet formation can be arranged on the cover sections of the compression chamber. If the compressor assembly is to be operated, so can the magnet assembly can be switched to neutral or repellent. If the compressor assembly should be out of operation, thus the hub-side transmission part brought out of the operating position with the wheel carrier side transmission part, the magnet assemblies can be set to attracting. By setting to attraction, the compressor component is held in the upper dead center in the region of the cover section.

The decoupling device can however also be formed by a permanent magnet, which is arranged for example in the cover section or in the compressor component itself. In the case of such a decoupling device the magnetic force acts virtually perpetually. However, if such a decoupling device is for example combined with the above described pneumatic spring, which is formed by the pressure chamber, the decoupling device can only hold the compressor component in the upper dead center when the pressure chamber is relieved of pressure and thus there is no pneumatic spring action.

The decoupling device can also be configured to move or stop the wheel carrier side transmission part. In other words, the magnetic force in this embodiment acts on the wheel carrier side transmission part, in order to move it or stop it.

It is also advantageous if the compressor assembly comprises a magnet-based coupling device, via which the hub-side transmission part can be held in an operating position with the wheel carrier side transmission part and/or can be brought into the into the operating position with the wheel carrier side transmission part. To this end, for example, a switchable magnet assembly can be arranged in the wheel carrier side transmission part, or in the wheel carrier side transmission part and the hub-side transmission part. If the compressor assembly is to begin operation, this switchable magnet assembly can be switched such that the wheel carrier side transmission part and the hub-side transmission part attract each other and transition into the operating position or remain in this operating position once they are in contact. This first contact can be brought about for example via the above described pressure chamber.

The coupling device can be configured to move or hold the wheel carrier side transmission part. In other words, the magnetic force in this embodiment acts on the wheel carrier side transmission part, in order to move it or hold it.

The coupling device can be formed by a permanent magnet, which is arranged in the wheel carrier side transmission part or in the hub-side transmission part. In the case of such a coupling device the magnetic force acts virtually perpetually. However, if such a coupling device is combined with a decoupling device, as described above, the coupling device is only able to hold the wheel carrier side transmission part and the hub-side transmission part in an operating position when the decoupling device is not actuated.

It is also advantageous if the decoupling device and/or the coupling device is configured and arranged to hold and/or move the compressor component via the magnetic force such that the position of the hub-side transmission part can be influenced as a result. Thus, in this embodiment the decoupling device and/or the coupling device do not act directly on the hub-side transmission part but rather on the compressor component, which in turn is connected to the hub-side transmission part.

In particular, the coupling device can advantageously be configured and arranged to hold the hub-side transmission part directly in an operating position and/or move it into the operating position via magnetic force.

Preferably the compressor component and/or the hub-side transmission part are directly influenced with magnetic force by the decoupling device and/or the coupling device.

It is also advantageous if a translator of a generator assembly is provided, wherein the generator assembly generates electrical energy by means of oscillating translational movement of the translator, wherein the compressor assembly comprises a generator transmission, which is designed to convert a rotational motion between the wheel carrier side and the wheel hub side into an oscillating translational movement of the translator, when a wheel carrier side generator transmission part is in an operating position with a hub-side generator transmission part, preferably wherein the generator transmission can be actuated independently from the transmission. It is advantageous when the hub-side generator transmission part can be moved electrically in and out of the operating position. The generator assembly can be used to generate electrical energy, which is used for example for sensors or for a circuit of the compressor assembly. Preferably the compressor assembly comprises an energy store, for example a battery, with which the generator assembly can be supplied with energy. One preferred embodiment transfers the hub-side generator transmission part into the operating position with the wheel carrier side generator transmission part automatically as soon as the stored energy in the energy store falls below a lower threshold. This ensures that there is always enough energy in the energy store.

It is also advantageous if the compressor component is configured to be plate-like, preferably wherein an underside of the plate-like compressor component forms the hub-side transmission part. Such a compressed assembly can be configured particularly compact. Preferably, such a plate-like compressor component is combined with the above described guide element.

The compressor component can generally have a guide section, preferably on its end averted from the upper dead center. Such a guide section is ordinarily configured such that it prevents a tipping and or a turning of the compressor component vis-à-vis the wall of the compression chamber. For example, a groove can be provided in the wall of the compression chamber and a corresponding projection on the compressor component. It is preferred if this guide section, or its part, is arranged in the wall of the compression chamber, outside of the area between upper and lower dead center of the wall of the compression chamber.

It is advantageous if the compressor component is configured connected in one piece to the hub-side transmission part. As a result, the compressor assembly is particularly robust.

It is advantageous, if a permanent magnet is arranged in the compressor component, or if the compressor component comprises a ferromagnetic material. As a result, the decoupling device and/or the coupling device can be easily realized for example by arranging corresponding magnets or magnet assemblies in the wall of the compression chamber.

It is advantageous, if a permanent magnet is arranged in one of the transmission parts and the other transmission part comprises a ferromagnetic material or likewise a permanent magnet with opposite polarity, so that the two transmission parts virtually attract each other. This embodiment can be designed with a correspondingly strongly configured decoupling device.

It is advantageous if at least one permanent magnet, preferably a series of permanent magnets, is arranged in a circumferential wall of the compression chamber. This permanent magnet or the series of permanent magnets can support the movement of the compressor component in the compression chamber. To this end the permanent magnets are preferably configured annular.

It is advantageous if a flutter valve is arranged on the compressor component and/or on the limitation of the compression chamber such that it is opened in an intake stroke of the compressor component and is closed in a delivery stroke of the compressor component.

It is advantageous if the wheel carrier side transmission part comprises a disk groove curve and/or a disk bead curve, preferably with a switch point section and with a working path and a freewheel path, which are connected via the switch point section. As a result, the hub-side transmission part can be virtually positively driven. A disk groove curve is in the process a curved path which is designed in the shape of a groove. An engagement element of the hub-side transmission part engages in this groove.

As a result, a restricted guidance of the hub-side transmission part is achieved. Correspondingly, a disk bead curve is curved path in the shape of a bead. In the case of such a disk bead curve the hub-side transmission part engages or encompasses the bead from above and below or from both sides and is thus likewise positively driven. A working path is a section of the curved path, in which the curved path is so non-uniform that the engaged hub-side transmission part is moved. The freewheel path differs from the working path. With a freewheel path, a section of the curved path is meant, in which the curved path is so uniform that the hub-side transmission part is not moved, not even when it is in engagement with the freewheel path. To make it possible to begin or end the operation of the compressor assembly, the curved path has the switch point section. By means of a suitable control pulse the hub-side transmission part can be brought from the freewheel path to the working path via the switch point section or from the working path to the freewheel path.

It is preferred if the compressor component is configured as a dual piston. As a result, the pump delivery rate of the compressor assembly can be increased.

The present application relates in a second aspect also to a compressor assembly for supplying pressure medium to a tire cavity of a tire of a vehicle wheel which can be mounted on a wheel hubs, wherein the wheel hub is mounted on a wheel carrier for rotation about an axis of rotation, wherein the compressor assembly includes at least a hub-side compression chamber and a compressor component, wherein a pressure medium to be conducted into the tire cavity in the hub-side compression chamber can be pressurized by movement of the compressor component, wherein the compressor assembly comprises a transmission, preferably a cam transmission, which is designed through an interaction of a wheel carrier side transmission part with a hub-side transmission part to convert a rotational motion between the wheel carrier side and the wheel hub side into a preferably oscillating translational movement of the compressor component. The compressor assembly includes a clutch device, which is configured to move the hub-side transmission part directly by means of magnetic force into or out of an operating position, in which it interacts with the wheel carrier side transmission part or to hold the hub-side transmission part directly by means of magnetic force in or out of the operating position.

In the process, the above described advantageous embodiments of the first aspect also relate to the compressor assembly according to the just mentioned second aspect, to be described subsequently.

In the case of the compressor assembly according to this second aspect the expression "directly by means of magnetic force" means that the holding or the movement of the hub-side transmission part is caused directly by the magnetic force and not that a further movable element independent from the hub-side transmission part is moved or held by the magnetic force and this element then for example moves or holds the hub-side transmission part by means of force or by positive locking.

The magnetic force in the case of the compressor assembly according to this second aspect also acts directly on the hub-side transmission part or on an element connected rigidly or in one piece to it.

Preferably, the compressor assembly according to this second aspect is configured to be annular and has several compression chambers arranged distributed in circumferential direction, in which in each case a compressor component is arranged namely such that it can be moved in an oscillating translational motion in radial direction. Advantageously, the individual compressor components are designed similar to a piston and have a projection pointing radially inward, this projection preferably simultaneously forms the hub-side transmission part. The hub-side transmission part can be brought into an operating position with a curved path, preferably an outer contour of a curved path, which is mounted on the wheel carrier side. The curved path advantageously forms the wheel carrier side transmission part.

Starting operation of the compressor assembly according to the first and the second aspect, thus, transferring the transmission parts into the operating position, e.g., the movement of the hub-side transmission part into the operating position, can occur autonomously, i.e., via a freely designed control arrangement in the vehicle, which begins operation of the compressor assembly when the tire pressure drops, or in response to a control signal from the vehicle driver. In other words, the compressor assembly pumps air into the tire when it is empty or pumps the tire in response to a control signal of the vehicle driver. A control signal of the vehicle driver is can be transmitted preferably via a Bluetooth connection to the compressor assembly. Such a control signal via Bluetooth connection can preferably be transmitted via a mobile phone by the vehicle driver to the compressor assembly.

Preferably, the compressor assembly according to the second aspect the compressor component is configured to be connected in one piece to the hub-side transmission part. Thus, a movement of the hub-side transmission part is transferred directly to the compressor component and a movement of the compressor component directly to the hub-side transmission part. The magnetic force used for coupling can thus act either on the hub-side transmission part or on the compressor component connected to it in one piece or on a piston section of the compressor component.

Moreover, as a result a further element for transmitting power between the hub-side transmission part and compressor component is unnecessary, which makes the compressor assembly according to the second aspect particularly robust.

It is preferred if the compression assembly according to the second aspect includes an electromagnet is arranged in the wall of the compression chamber, preferably in the radially inward wall of the compression chamber. This electromagnet can in the process be configured such that it is magnetic upon energization, as an alternative however the electromagnet can also be magnetic upon energization. A non-magnetic electromagnet upon energization can in general be realized by using a permanent magnet as the core. The magnetic force of the permanent magnet is thus virtually reversed. If the electromagnet is magnetic in the unenergized state, so it can for example be arranged in the radially inward bottom of the compression chamber and the compressor component or a piston-like section of the compressor component can be held in the decoupled state by magnetic force. The hub-side transmission part rigidly connected to the compressor component is then held by magnetic force out of the operating position. In the case of the energization of the electromagnet the magnetic force of the permanent magnet stops working. Since the hub-side transmission part is no longer being held out of the operating position, the centrifugal forces that occur during driving of the vehicle force it radially outward and the hub-side transmission part is brought into engagement with an inner contour of a curved path by the centrifugal forces, so that it interacts with this curved path, which forms the wheel carrier side transmission part.

It is preferred that the compression assembly according to the second aspect has a permanent magnet arranged in the compressor component. As a result, the compressor component can for example autonomously magnetically "stick" or adhere on the preferably radially inward wall of the compression chamber. This magnetic force-based adherence of the compressor component on the bottom of the compression chamber can then be disengaged for example via an electromagnet in the wall. To this end the electromagnet is poled such that it repels the permanent magnets in the compressor component upon energization. The hub-side transmission part then couples to the wheel carrier side transmission part, or is moved into operating position with it. This movement occurs, e.g., in turn via centrifugal forces during operation of the vehicle. However, there are other forces conceivable that could cause this movement, e.g., a pneumatic actuation.

It is preferred that the compression assembly according to the second aspect includes a pressure medium inlet is arranged in the radial wall, preferably the radially inward wall, of the compression chamber for supplying a pressure surge to the compression chamber, which can be connected to a pressure medium source via a switchable valve, preferably a magnetic valve. Via the pressure medium inlet pressure medium from the pressure medium source can be admitted in the shape of a pressure surge. By means of such a pressure surge a magnetic adherence of the compressor component from the wall of the compression chamber can be removed, whereupon then the compressor component driven by centrifugal forces is moved such that the hub-side transmission part is moved into the operating position with the wheel carrier side transmission part.

The pressure medium inlet in the radially inward wall of the compression chamber of the compression assembly according to the second aspect can also be combined with a permanent magnet, which is arranged in the radially inward wall of the compression chamber, wherein the compressor component does not have to comprise a permanent magnet, but rather merely a magnetic material, which can interact with the permanent magnet, which is arranged in the wall of the compression chamber.

It is preferred that the compression assembly according to the second aspect includes a pressure medium outlet which can be connected via a line section, in which a check valve is arranged in the radial wall, preferably the radially inward wall, of the compression chamber can be connected to the tire cavity, wherein the line section is connected to a relief valve, via which the line section can be drained. Preferably the check valve on the pressure medium outlet is in the process designed such that in the delivery stroke of the compressor component a residual pressure is always maintained in the compressed part of the compression chamber, wherein the residual pressure prevents the compressor component from coming into contact with the wall, in particular the radially inward wall, of the compression chamber. If the compressor component does not come into contact with the wall of the compression chamber a magnetic adherence is also cannot occur. In order to bring the hub-side transmission part out of interaction with the wheel carrier side transmission part, the line section can be drained via the relief valve. The check valve then opens and the residual pressure medium escapes from the compression chamber. Then the compressor component comes into contact with the radially inward wall of the compression chamber and can magnetically adhere to it. The transmission parts are then decoupled or the hub-side transmission part is then moved out of the operating position.

It is preferred that the compression assembly according to the second aspect includes at least one permanent magnet, preferably a series of permanent magnets, arranged in a circumferential wall of the compression chamber. The series of permanent magnets is preferably arranged in the wall of the compression chamber with uniform polarity. Preferably the permanent magnets in the wall of the compression chamber are configured to be annular. Preferably in the process a further permanent magnet is arranged in the compressor component. If the permanent magnet of the compressor component is in the permanent magnet configured to be annular of the wall of the compression chamber, these magnets support the movement of the compressor component in the compression chamber. As a result, the compressor assembly can also be safely operated at very high speeds or at very high centrifugal forces.

It is preferred that the compression assembly according to the second aspect includes the compressor component configured and arranged to convey pressure medium during the operation of the compressor assembly both by means of a radially inward movement and by means of a radially outward movement. As a result, the compressor component or the compressor assembly pumps particularly efficiently, since the compressor component virtually works as a dual piston.

It is preferred that the compression assembly according to the second aspect includes one flutter valve, preferably two flutter valves, arranged on the compressor component, wherein one of the flutter valves is configured to be opened radially inward and the other flutter valve is configured to be opened radially outward. As a result, a switching between suctioning and pumping or between intake stroke and delivery stroke can occur particularly efficiently. The flutter valves opening in different directions facilitate in particularly simple manner the pumping during inward and outward movement of the compressor described in the previous paragraph or facilitate a function as a dual piston.

It is preferred for the compression assembly according to the second aspect that the wheel carrier side transmission part comprises a disk groove curve and/or a disk bead curve, preferably with a switch point section and with a working path and a freewheel path, which are connected via the switch point section. A disk groove curve is a curved path, which is designed in the shape of a groove. An engagement element of the hub-side transmission part engages in this groove.

As a result, a restricted guidance of the hub-side transmission part is achieved. Correspondingly, a disk bead curve is a curved path in the shape of a bead. In the case of such a disk bead curve the hub-side transmission part engages the bead from above and below or from both sides and is thus likewise positively driven. A working path is a section of the curved path, in which the curved path is non-uniform such that the hub-side transmission part in engagement is moved. The freewheel path differs from the working path. With a freewheel path, a section of the curved path is meant, in which the curved path is uniform such that the hub-side transmission part is not moved, even if it is in engagement with the freewheel path. In order to facilitate the beginning or end of operation of the compressor assembly the curved path has the switch point section. By means of a suitable control pulse the hub-side transmission part can be brought from the freewheel path to the working path or from the working path to the freewheel path.

It is preferred for the compression assembly according to the second aspect that the hub-side transmission part comprises a tappet output. This tappet output is preferably rigidly connected or connected in one piece to the compressor component.

It is preferred for the compression assembly according to the second aspect that the tappet output can be driven via an inner contour of the disk curve. The contour of the disk curve is radially inward. The guided movement occurs radially inward. This ensures that the hub-side transmission part or the compressor component moves safely radially inward against the centrifugal forces.

The tappet output can for the compression assembly according to the second aspect can however also be driven via an outer contour of the disk curve. Then the restricted guidance of the movement occurs radially outward.

It is preferred for the compression assembly according to the second aspect that the compressor assembly comprises several compressor components, which are preferably arranged in a circumferential direction uniformly distributed around the axis of rotation. It is preferred for the compression assembly according to the first and the second aspect that the hub-side transmission part comprises a roller tappet, as a result of which ensures particularly low-friction contact with the wheel carrier side transmission part.

It is preferred for the compression assembly according to the first and the second aspect that the roller tappet is self-lubricating, preferably with a lubricant reservoir in a shaft of the roller tappet. This minimizes the friction. It is preferred in the process if lubricant in the lubricant reservoir is prestressed via a prestressing device in the direction of a roller of the roller tappet. It is also preferred that the lubricant reservoir comprises an outlet protection on the roller side. Guaranteed lubrication increases the service life of the compressor assembly.

It is also preferred for the compression assembly according to the first and the second aspect that the compressor assembly includes a device for the measurement and/or display of the pressure, the temperature and/or humidity of the pressure medium in the tire cavity, preferably via which the pressure medium line can be connected to the tire cavity.

It is also preferred for the compression assembly according to the first and the second aspect that the compressor assembly is connected to a filter on the pressure medium inlet side.

It is also preferred for the compression assembly according to the first and the second aspect that the compressor assembly is configured to use pressure medium from the tire cavity or via pumping through the compressor assembly to clean the filter.

BRIEF DESCRIPTION OF SEVERAL VIEWS OF THE DRAWINGS

Further features, possible applications and advantages of the invention arise from the following description of exemplary embodiments of the invention, which will be explained with the aid of the drawing, wherein the features can be essential to the invention both alone and in various combinations, without making explicit reference to this again. The figures show the following:

FIGS. 20A to 20C show a switchable magnet assembly in different switching positions.

DETAILED DESCRIPTION OF THE INVENTION

Figure 1:
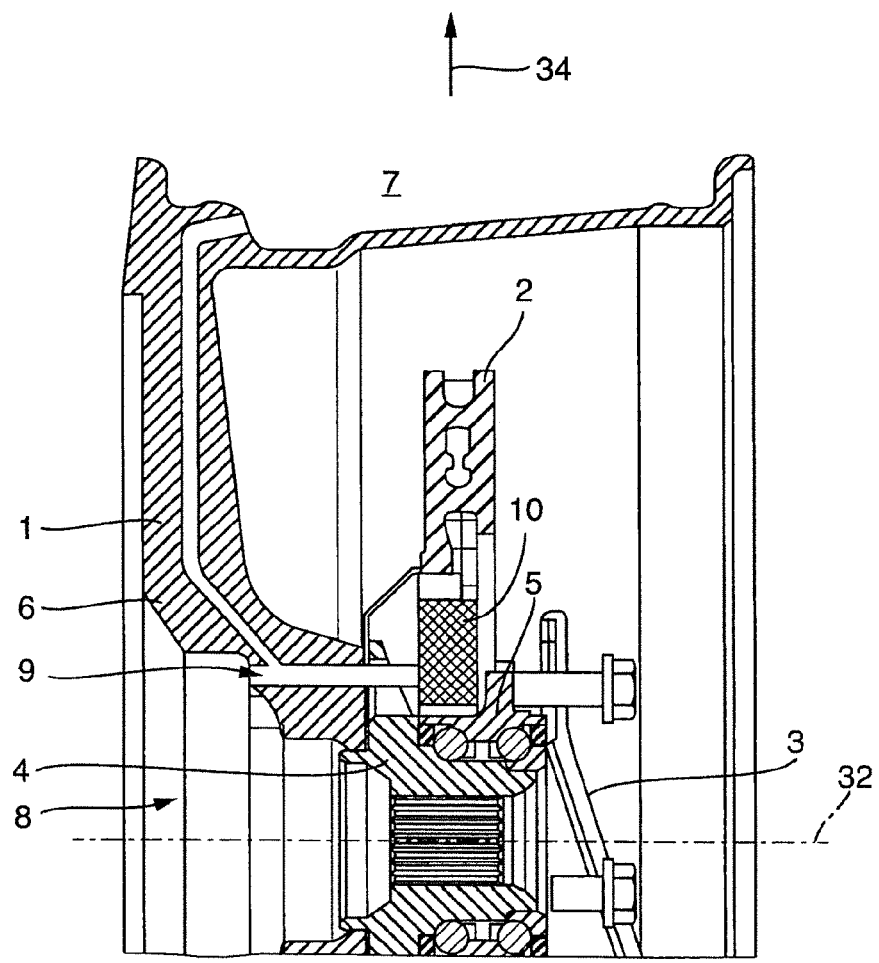
FIG. 1 shows a schematic representation of the arrangement of a compressor assembly in accordance with the invention.

In the following figures corresponding components and elements bear the same reference numerals. For the sake of clarity not all reference numerals are reproduced in all of the figures.

In FIG. 1 the installation position of a compressor assembly in accordance with the invention 10 is schematically represented. The compressor assembly 10 in FIG. 1 is only schematically represented by a cross hatched area. FIG. 1 shows a rim 1, a brake disk 2, a wheel carrier 3, a wheel hub 4 and a wheel bearing 5.

A pressure medium line 6 extends from the compressor assembly 10 to a tire cavity 7. The tire itself is not depicted in FIG. 1.

In the region of a wheel hub receptacle 8 the rim has a schematically represented connection 9 for supplying a sealant. The connection 9 is optional.

In the embodiment shown in FIG. 1 the pressure medium line 6 extends through the material of the rim 1. Advantageously a section of the pressure medium line 6 is realized by a hollow bored brake disk fastening screw of the brake disk 2. An axis of rotation bears reference numeral 32. A radial direction bears reference numeral 34. The hub side and with it the hub-side components rotate around the axis of rotation 32 during operation of the vehicle with respect to the wheel carrier side, thus the wheel carrier side components, such as for example the wheel carrier 3 or also the passenger compartment of the vehicle.

Figure 2:
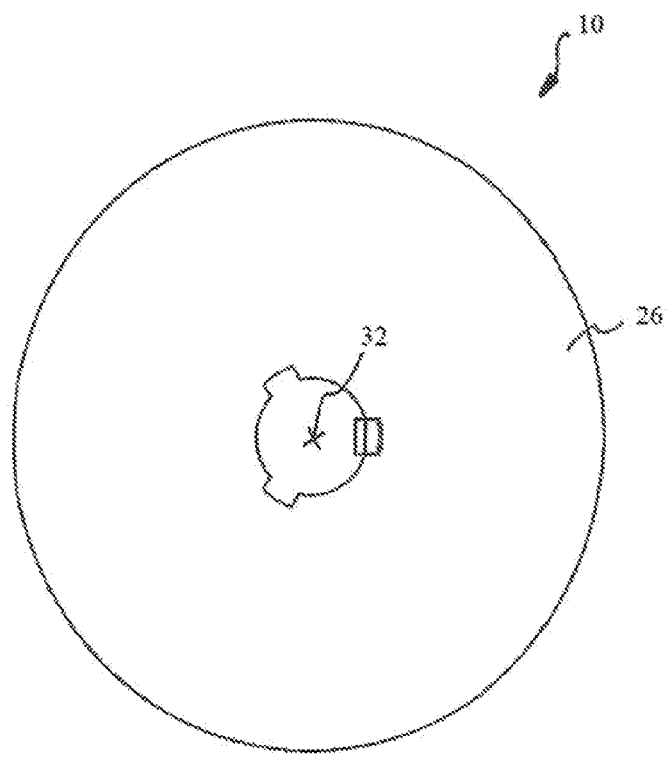
FIGS. 2 to 4 show a first embodiment of the compressor assembly in accordance with the invention in different views.
Figure 3:
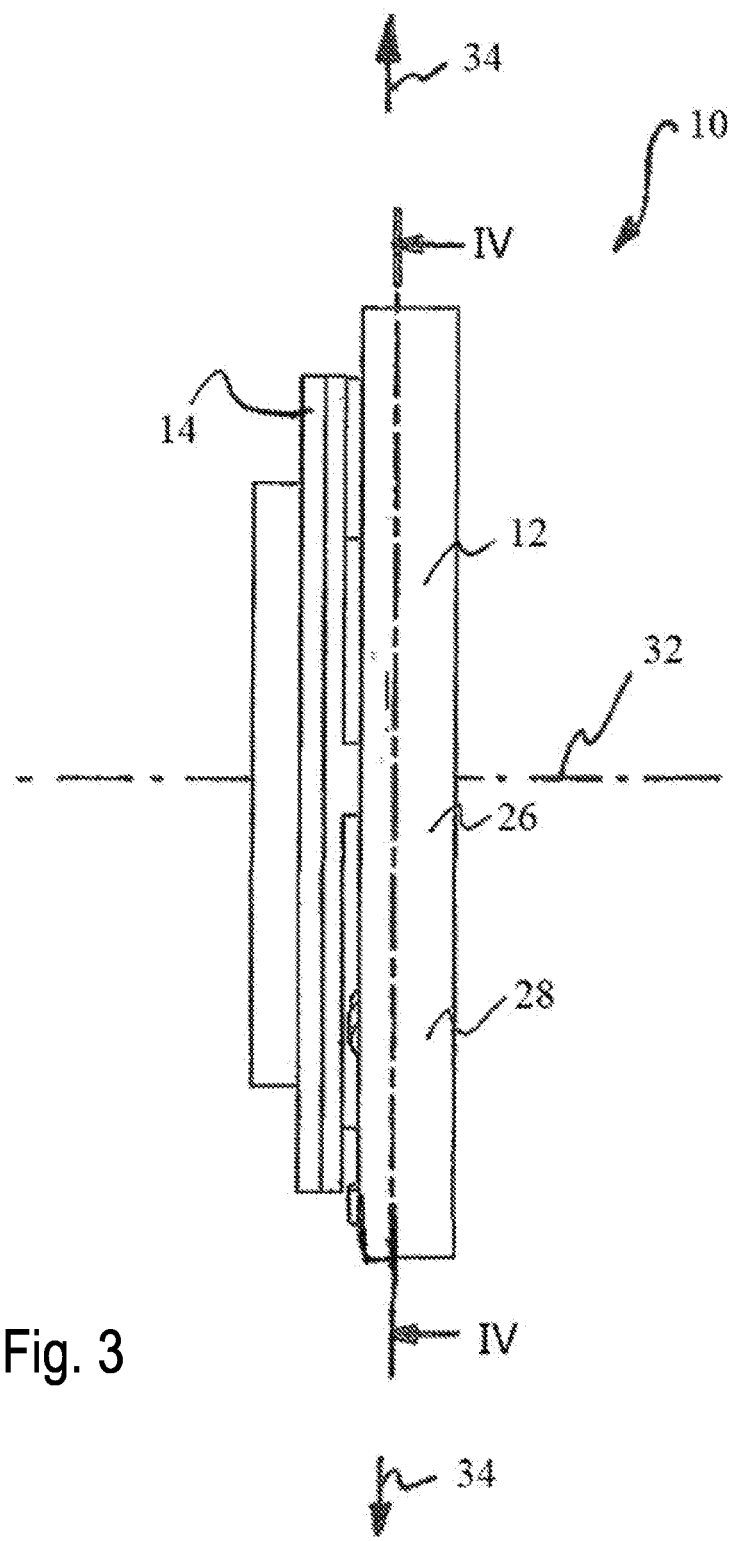
Figure 4:
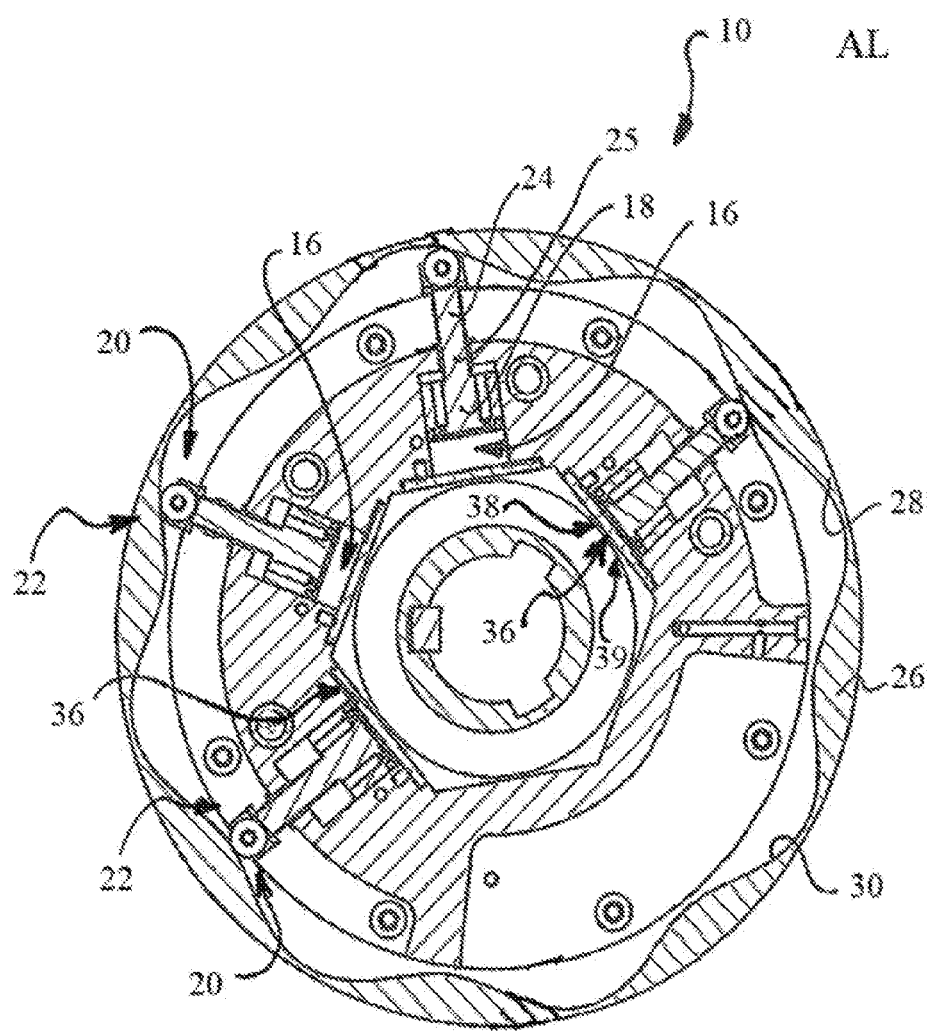

In FIGS. 2 to 4 a first embodiment of a compressor assembly in accordance with the invention 10 is shown in detail. The compressor assembly 10 comprises a first housing part 12 and a second housing part 14.

FIG. 4 depicts the compressor assembly 10 from FIGS. 2 and 3 sectioned along the line IV-IV. The compressor assembly 10 comprises a total of four hub-side compression chambers 16, of which only two bear a reference numeral.

Each of the compression chambers 16 is assigned a hub-side compressor component 18. The compressor assembly 10 comprises several transmissions 20, wherein each of the compression chambers 16 is assigned a transmission 20. The transmissions 20 are in each case designed as cam transmissions 22 here.

The transmissions 20 each have a hub-side transmission part 24. The hub-side transmission parts 24 are in each case formed by tappet outputs 25. The compressor components 18 are in the process configured in one piece with the tappet outputs 25 or hub-side transmission parts 24. The hub-side transmission parts 24 of the transmissions 20 can in each case interact with a wheel carrier side transmission part 26 of the compressor assembly 10.

Figure 5:
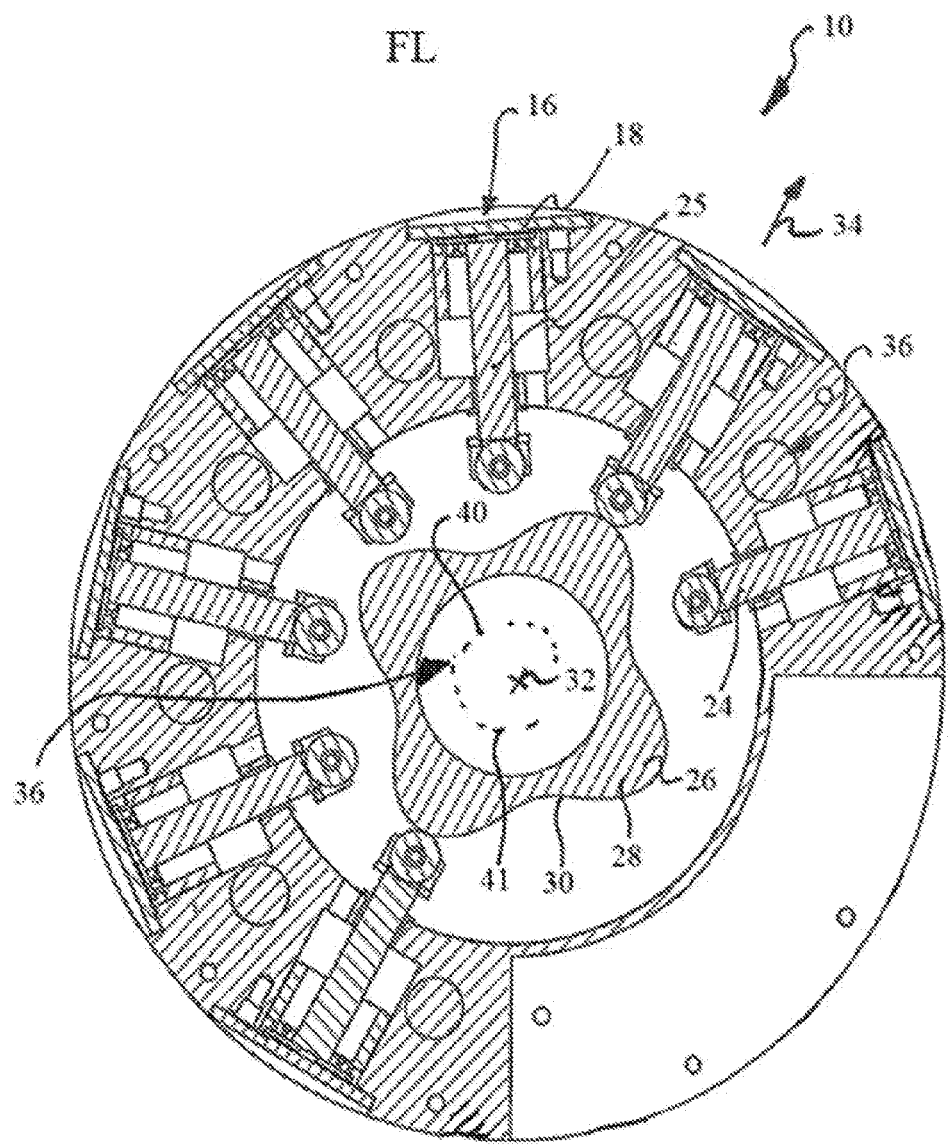
FIG. 5 shows a further embodiment of the compressor assembly in accordance with the invention in a view corresponding to FIG. 4.

The compressor assembly 10 or its transmission 20 has in the process only a single wheel carrier side transmission part 26, which can interact with each of the hub-side transmission parts 24. The wheel carrier side transmission part 26 is configured as a disk curve 28 with a curve contour 30, which is internal in the embodiment of FIGS. 2-4, thus representing an inner contour. In contrast to this, the curve contour 30 in the embodiment of FIG. 5 is configured externally, thus the curve contour 30 of FIG. 5 represents an outer contour.

FIG. 4 shows the compressor assembly 10 in a working operation position AL. In the working operation position AL, the hub-side transmission parts 24 interact with the wheel carrier side transmission part 26, thus are in an operating position. The compressor assembly 10 is in operation. The hub-side transmission parts 24 are in direct mechanical contact with the wheel carrier side transmission part 26 here.

In the case of a driving vehicle the disk curve 28 is stationary vis-à-vis the vehicle. The hub-side components, for example the hub-side transmission parts 24, rotate about an axis of rotation 32 or rotate with respect to the vehicle. Depending on the vehicle speed, high centrifugal forces act on the hub-side transmission parts 24 and the compressor components 18. The centrifugal forces act outward in a radial direction 34. These centrifugal forces push the hub-side transmission parts 24 into contact with the disk curve 28 or the wheel carrier side transmission part 26 formed by it (FIG. 4).

In FIG. 4 the hub-side transmission parts 24 can be moved away from the wheel carrier side transmission part 26 against the centrifugal force via magnetic forces via clutch devices 36, in the shape of a respective electromagnet 38, which is arranged in the radially inward wall of the respective compression chambers 16. The electromagnets 38 thus form a decoupling device 39. The hub-side transmission parts 24 of the compressor assembly 10 of FIG. 4 can, through energization of the electromagnets 38, be moved out of the operating position with the wheel carrier side transmission part 26, the compressor assembly 10 is then no longer in the working operation position AL. The energized electromagnets 38 act via magnetic forces directly on the hub-side transmission parts 24 or on the compressor component 18 designed in one piece with it. As long as the electromagnets 38 are energized, the electromagnets 38 hold the hub-side transmission parts 24 out of the operating position with the wheel carrier side transmission part 26. A correspondingly stronger permanent magnet can also be provided, which is virtually deactivated through energization of the electromagnet 38. In this case the electromagnet 38 must only be energized for activation of the compressor assembly 10.

FIG. 5 shows a further embodiment of the compressor assembly 10, as described above with a wheel carrier side transmission part 26, which is designed as a disk curve 28 with a curve contour 30 as outer contour.

FIG. 5 shows the compressor assembly 10 in a freewheeling operation position FL. In this freewheeling operation position FL, the hub-side transmission parts 24 do not interact with the wheel carrier side transmission part 26. The compressor assembly 10 is not in operation.

Via a clutch device 36, in the shape of a wheel carrier side electromagnet 40, the hub-side transmission parts 24 can, against the centrifugal force via magnetic forces, be moved to the wheel carrier side transmission part 26. The electromagnet 40 constitutes a coupling device 41. The compressor assembly 10 of FIG. 5 is then in the working operation position.

Figure 6:
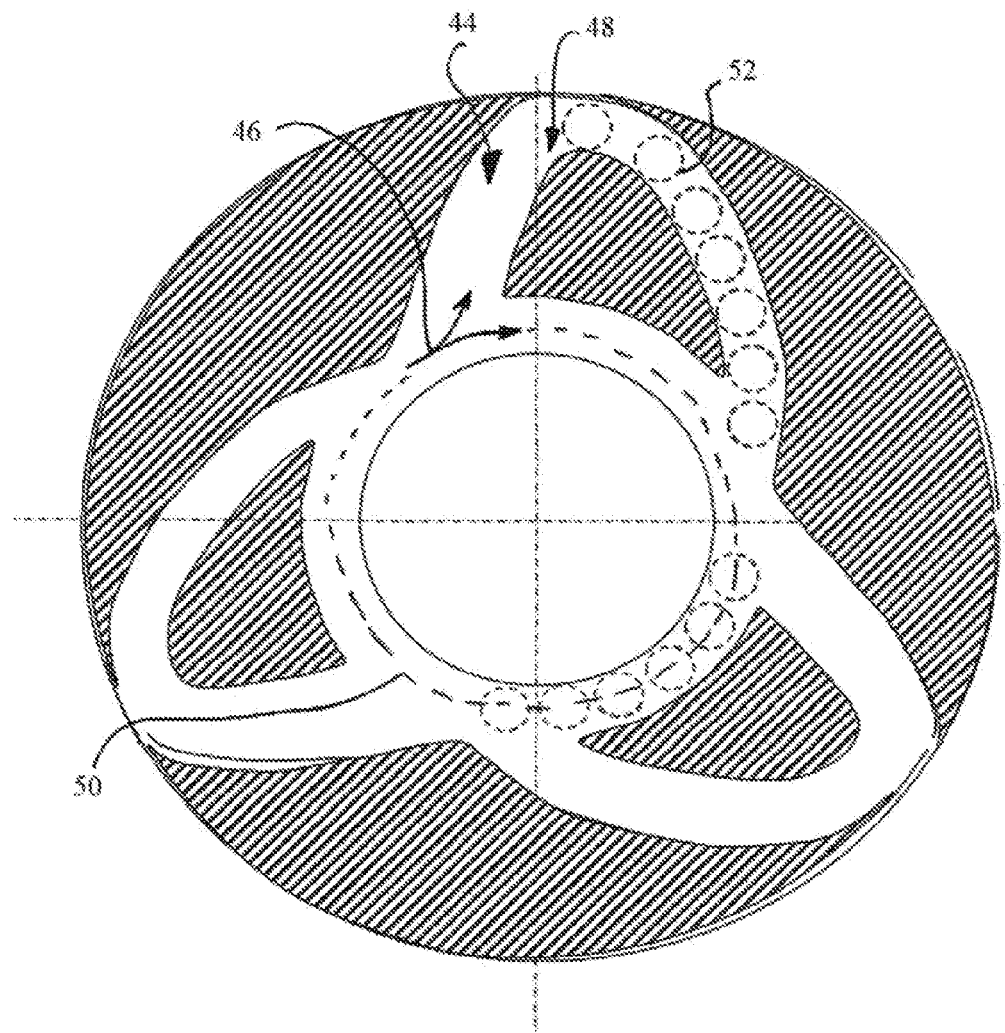
FIG. 6 shows an embodiment of a wheel carrier side transmission part.

FIG. 6 shows an alternative wheel carrier side transmission part 26, which comprises a disk groove curve 44. The disk groove curve 44 comprises a switch point section 46, which is designated by a double arrow. The switch point section 46 is connected to a working path 48 and a freewheel path 50, which is represented by a broken line. An engagement element 52, which is connected to the hub-side transmission part 24 and for example can be designed as a roller, is symbolically represented. If the engagement element 52 moves on the freewheel path 50 there is no movement of the hub-side transmission part 24 connected to it in radial direction 34. However, if the engagement element 52 is engaged with the working path 48, the engagement element 52 moves in a positively driven manner in the working path and thus the hub-side transmission part 24 also moves in a positively driven manner. Via a magnet based decoupling device 39 and a magnet-based coupling device 41 the hub-side transmission part 24 or its engagement element 52 can be switched from the working path 48 to the freewheel path 50. In the working path 48 the hub-side transmission part 24 is in operating position with the wheel carrier side transmission part 26. In the freewheel path 50 the hub-side transmission part 24 is not in operating position with the wheel carrier side transmission part 26.

Figure 7B:
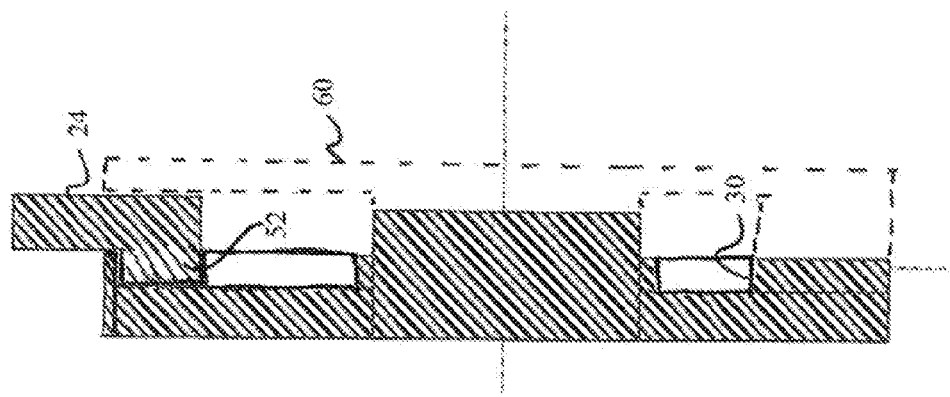
FIG. 7B shows a side view of the embodiment of FIG. 7A.
Figure 7A:
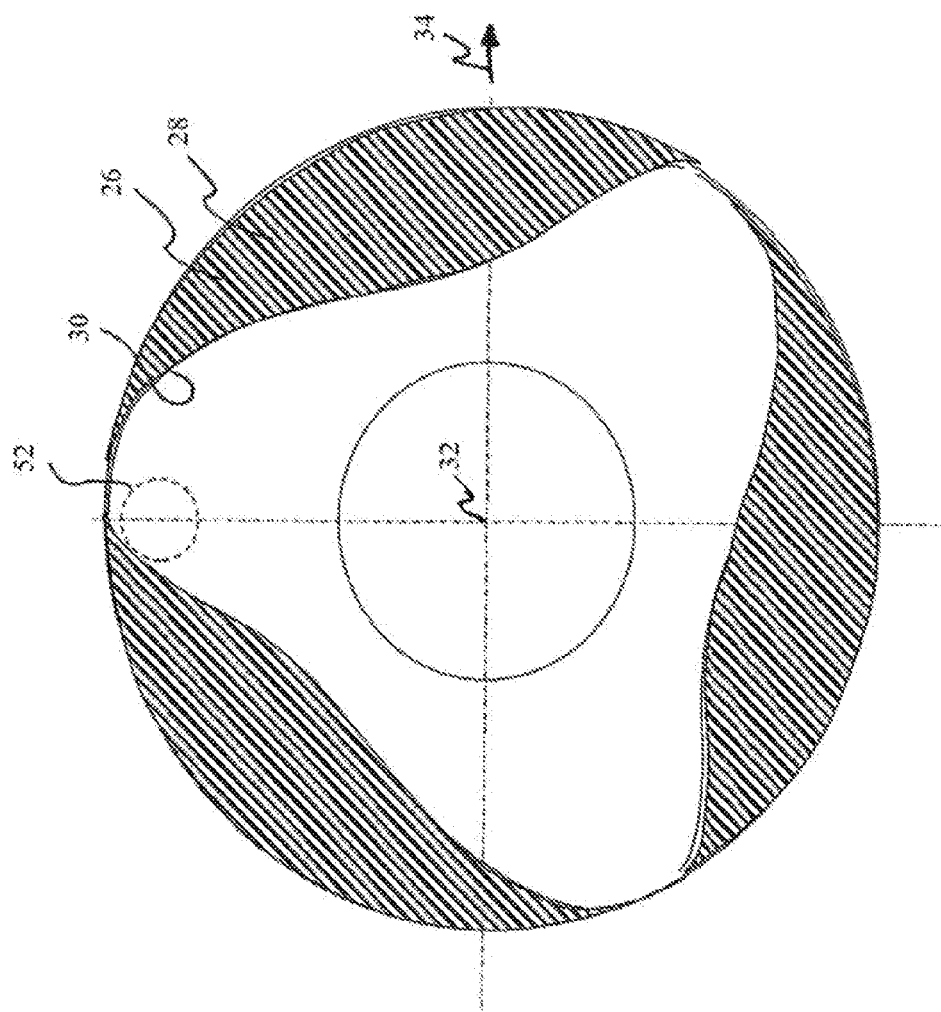
FIG. 7A shows a further embodiment of a wheel carrier side transmission part.

FIGS. 7A-B illustrate the principle of a lateral engagement of the engagement element 52 to the curve contour 30. On the left the curve contour 30 is shown schematically viewed along the axis of rotation 32, and on the right correspondingly schematically when looking against the radial direction 34 in a sectional view. The curve contour 30 can also be designed to be closed viewed along the axis of rotation 32 viewed before and after the engagement element 52, which is indicated by the dashed line with the reference numeral 60.

A restricted guidance on both sides of the engagement element 52, as is the case in the working path 48 of FIG. 6, is particularly well suited for a combination with a compressor component 18, which is designed in the style of a dual piston.

Figure 8:
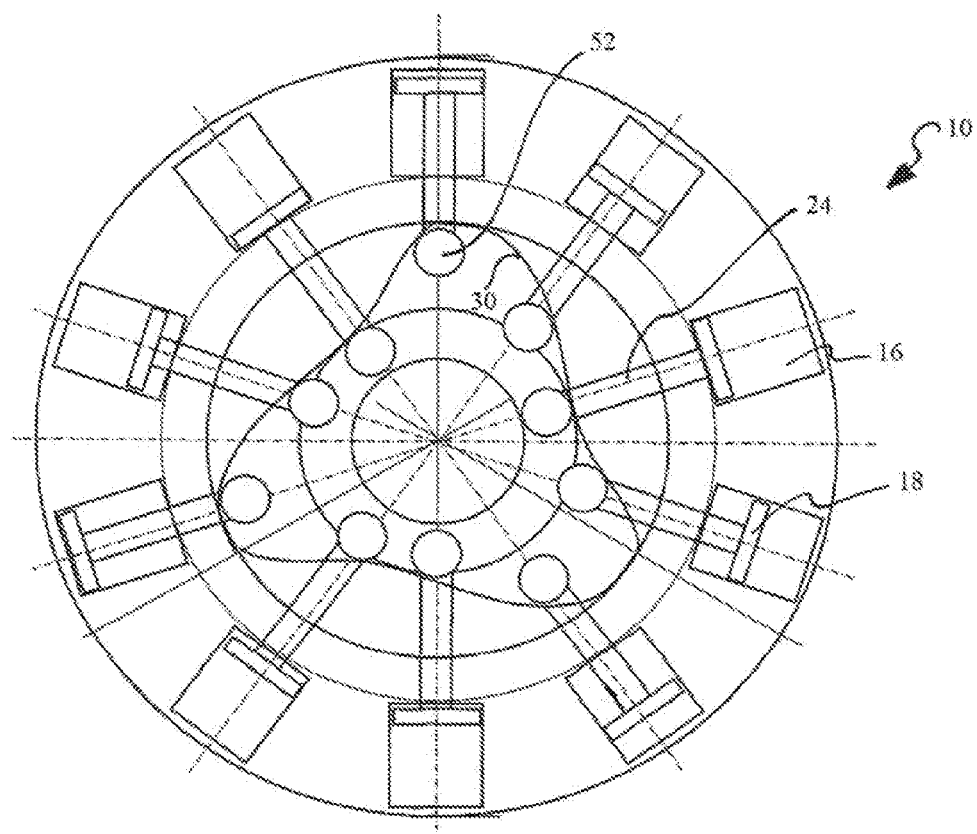
FIG. 8 shows a further embodiment of the compressor assembly in accordance with the invention with a wheel carrier side transmission part corresponding to FIG. 7A.

FIG. 8 shows a compressor assembly 10 in accordance with the principle of lateral engagement from FIG. 7A-B.

Figure 9:
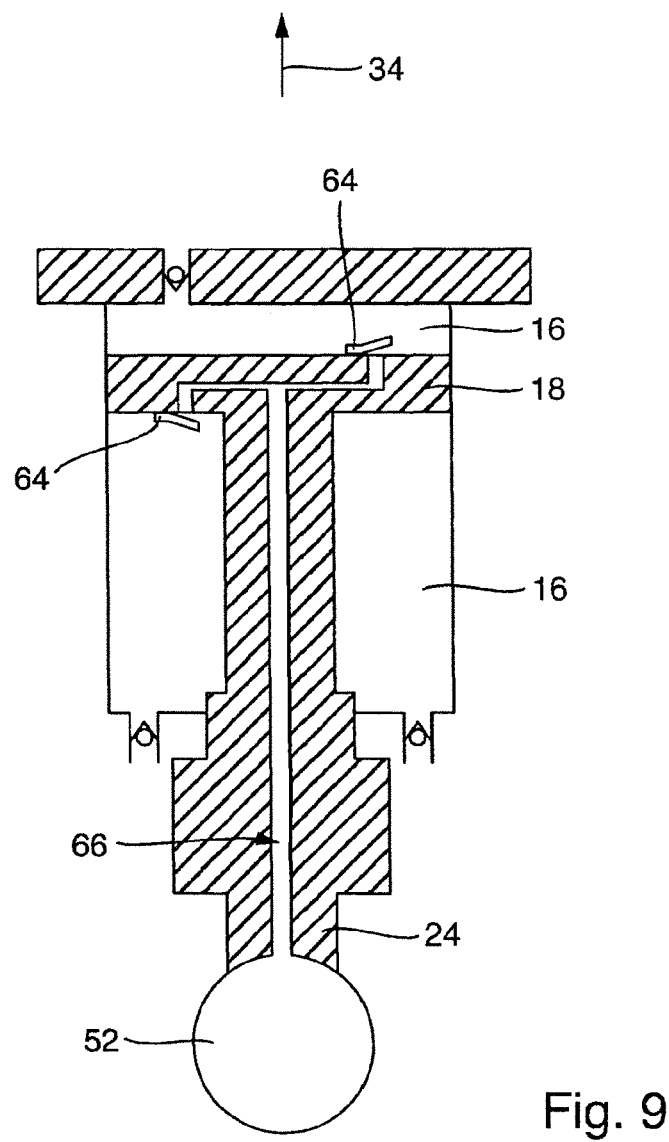
FIG. 9 shows a compression chamber with compressor component of an embodiment in detail.

A compressor component 18, which is designed in the manner of a dual piston, is shown schematically in FIG. 9. Shown on the compressor component 18 are flutter valves 64 which can open radially inward and radially outward. In the respective delivery stroke the flutter valves 64 close. The air induction in the intake stroke can occur via a channel 66 in the hub-side transmission part 24. As an alternative, flutter valves 64 can also be arranged on the wall of the compression chamber 16. In the representation of FIG. 9 these would then be arranged above and below and would open to the compression chamber 16.

Figure 10:
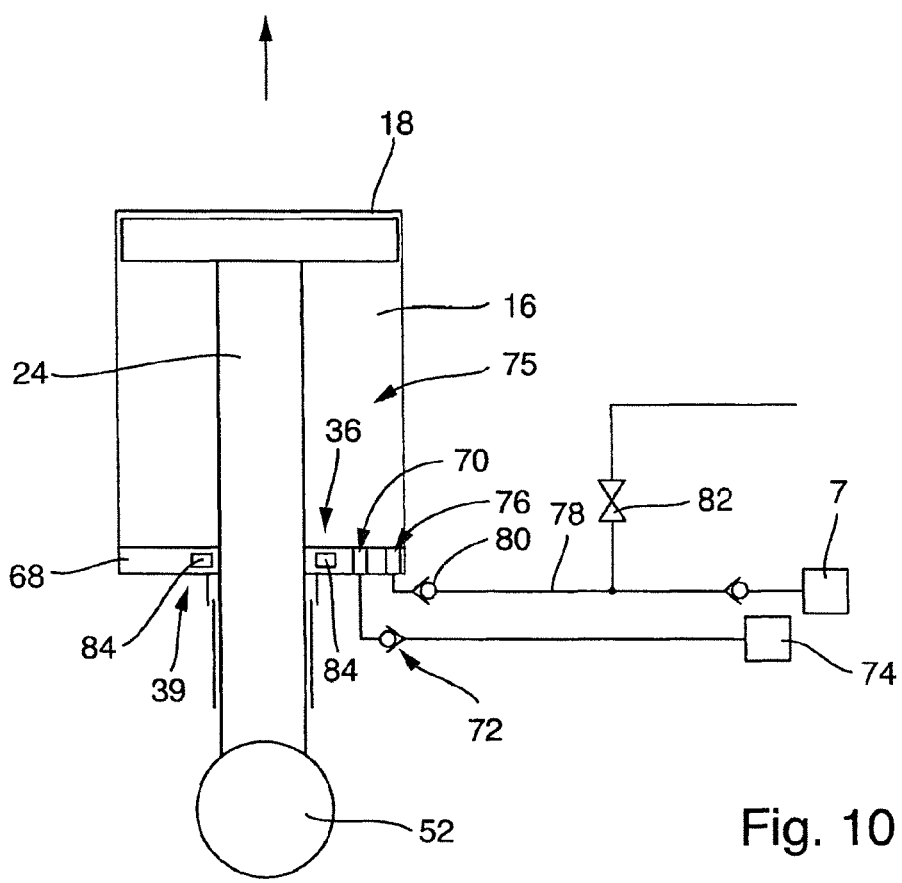
FIG. 10 shows a compression chamber with compressor component of a further embodiment in detail.

FIG. 10, similar to the representation of FIG. 9, shows an individual compression chamber 16 with a compressor component 18, wherein a pressure medium inlet 70 for supplying a pressure surge to the compression chamber 16, is arranged in the radial wall 68, to be more precise, the radially inward wall 68, of the compression chamber 16, said pressure medium inlet which can be connected via a switchable valve 72, preferably a magnetic valve, to a pressure medium source 74. In this embodiment the compression chamber 16 simultaneously forms a pressure chamber 75.

The compressor assembly 10 from FIG. 10 is otherwise similar in in structure to compressor assembly 10 from FIG. 8, thus configured with lateral engagement.

A pressure medium outlet 76 is also arranged in the radial wall 68 of the compression chamber 16, which can be connected to the tire cavity 7 via a line section 78, in which a check valve 80 is arranged, wherein the line section 78 is connected to a relief valve 82, via which it can be drained or can be relieved from pressure.

In the operation of the compressor assembly 10, with a configuration of compression chamber 16 and compressor component 18 as shown in FIG. 10 (the overall design of the compressor assembly corresponds to FIG. 8), the compressor component 18 can be held on the wall of the compression chamber 16 via magnetic forces by means of a permanent magnet 84, which is arranged in the wall of the compression chamber 16. To disengage the compressor component 18 from the permanent magnet 84, pressure medium from the pressure medium source 74 is introduced via the valve 72 and the pressure medium inlet 70 into the compression chamber 16 in the form of a pressure surge. As a result, the compressor component 18 disengages from the permanent magnet 84 and the centrifugal forces pull it radially outward, wherein the hub-side transmission part 24 with its engagement element 52 is brought into operating position with the wheel carrier side transmission part 26 (not shown, see the curved path in FIG. 7).

In the delivery stroke the compressor component 18 in the representation of FIG. 10 moves downward, in the process pressure medium flows through the pressure medium outlet 76 to the tire cavity 7. However, a certain residual pressure remains in the compression chamber 16. This residual pressure prevents the compressor component 18 from coming into adhering contact with the permanent magnets 84. The compression chamber 16 acts as a pneumatic spring and constitutes a pressure chamber 25. If the compressor assembly 10 ceases its operation, the line section 78 is drained via the relief valve 82. The residual pressure in the pressure chamber 25 or compression chamber 16 is then released via the check valve 80 in the line section 78.

As an alternative or in addition to the coupling via the just described pressure surge, an electromagnet 38 can also be arranged in the wall of the compression chamber next to the permanent magnet 84, wherein the electromagnet 38 is configured such that upon energization it reverses the magnetic forces of the permanent magnet 84. The just described combination of permanent magnet 84 and electromagnet 38 in the process constitutes a combined decoupling device 39. Via centrifugal forces the hub-side transmission part 24 is then brought into operating position with the wheel carrier side transmission part 26. However, this can also happen via magnetic forces that have are sufficiently strong.

A permanent magnet can also be arranged in the compressor component 18. Such a permanent magnet can amplify the interaction just described in reference to FIG. 10. The permanent magnet in the compressor component 18 can also be configured arranged such that it interacts with of the wall of the compression chamber 16 and upon energization of an electromagnet 38 arranged on this wall is repelled by it. A further permanent magnet can also be arranged in the wall of the compression chamber 16, which constantly interacts in attractive manner with the permanent magnets in the compressor component 18, wherein this attracting effect can however be reversed through energization of an electromagnet in the wall of the compression chamber 16.

Figure 11:
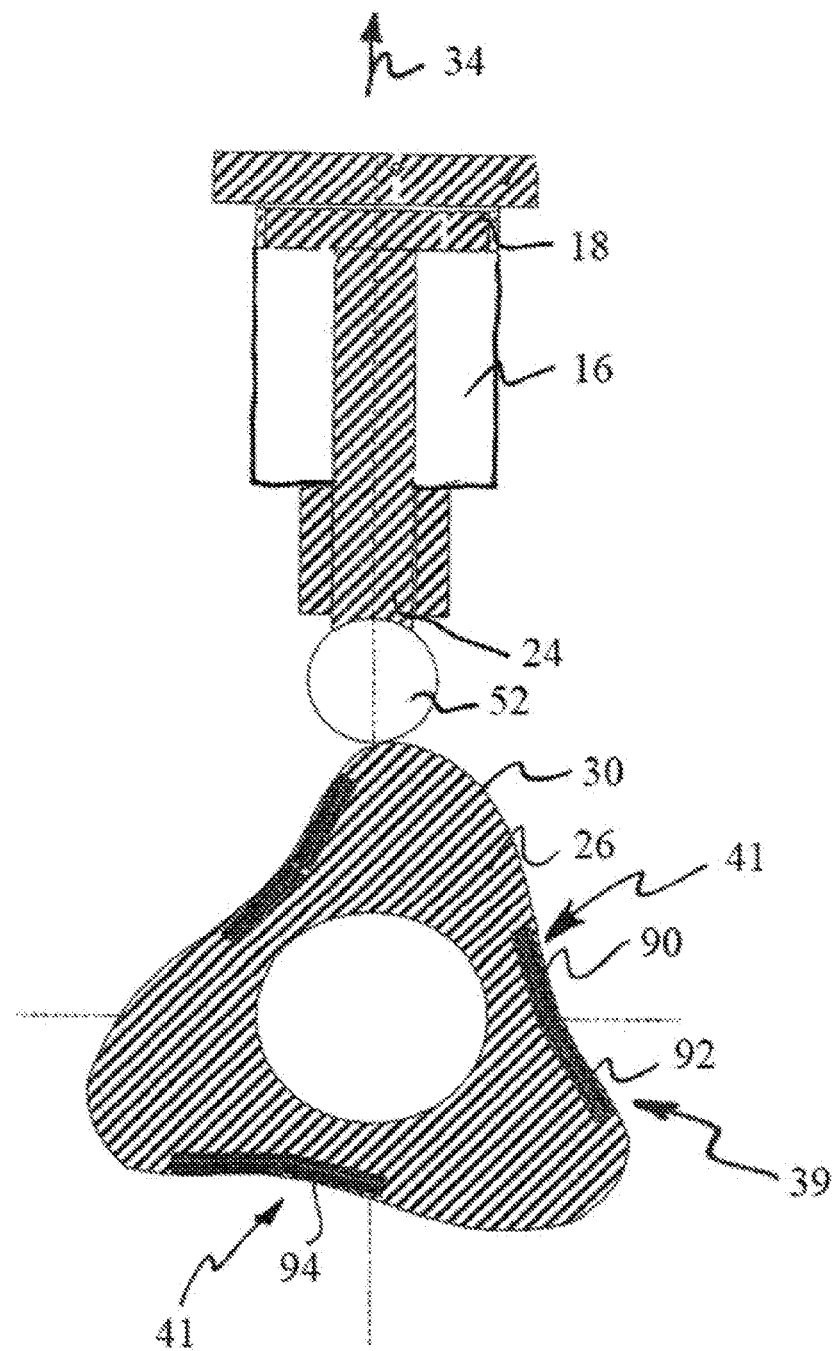
FIG. 11 shows a compression chamber with compressor component of a further embodiment in detail.

Permanent magnets 90 and/or electromagnets 92 can also be arranged in the wheel carrier side transmission part 26 and attract the hub-side transmission part 24, constituting a coupling device 41, or repel in the case of corresponding and energization and arrangement, constituting a decoupling device 39. Such a design is illustrated in FIG. 11.

For example, the permanent magnets 90 can ensure that the hub-side transmission part 24 remains in contact with the wheel carrier side transmission part 26 once it has made contact and thus is in an operating position (coupling device 41). By means of a correspondingly poled energization of the electromagnet 92 the magnetic force of the permanent magnets 90 can be weakened or reversed, so that the hub-side transmission part 24 is brought out of the operating position (decoupling device 39). Additional electromagnets 94 can also be arranged, which upon energization result in an amplification of the magnetic force of the permanent magnets 90 and thus can bring the hub-side transmission parts 24 into operating position with the wheel carrier side transmission part 6 20 (coupling device 41).

Figure 12:
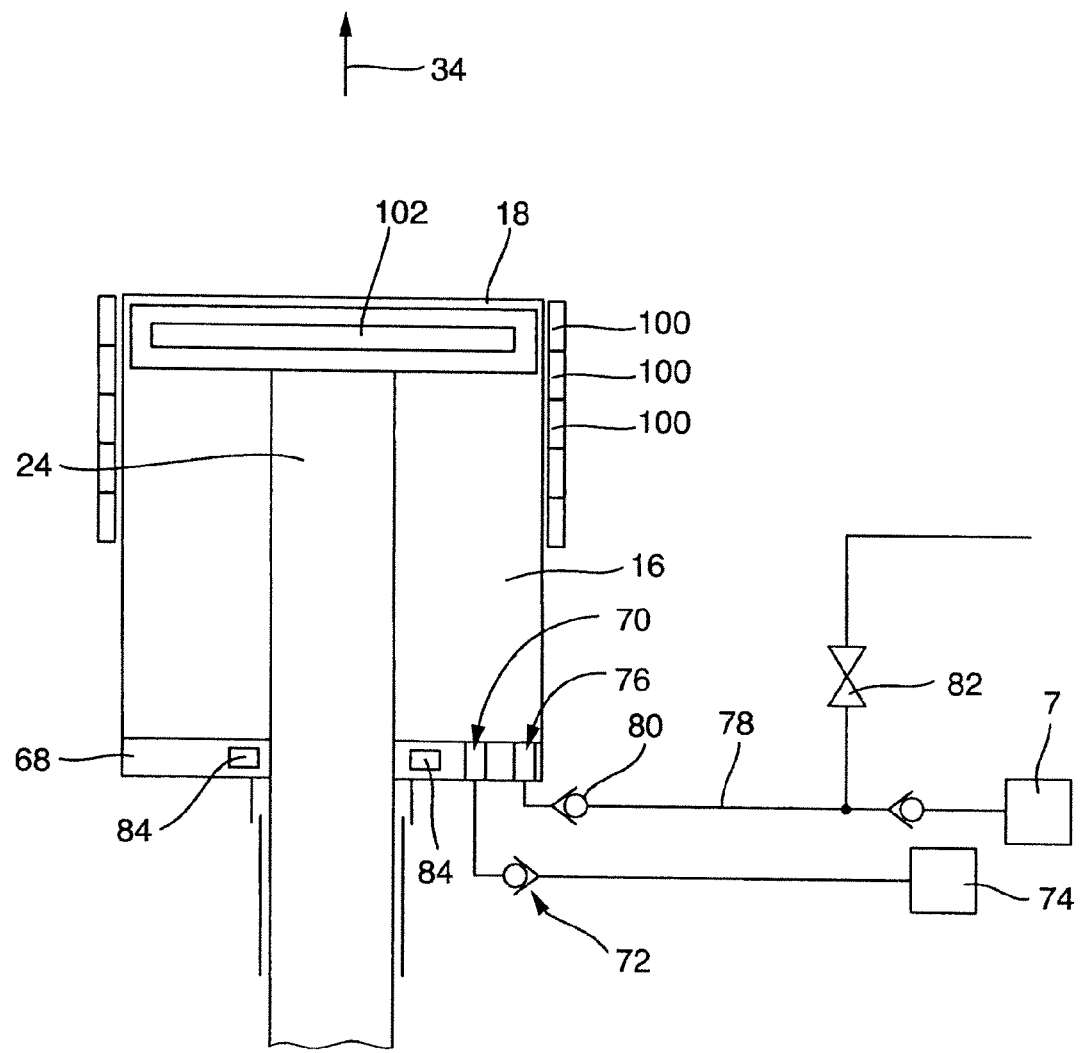
FIG. 12 shows a compression chamber with compressor component of a further embodiment in detail.

FIG. 12 shows an area around a compression chamber 16, similar to the variant that is shown in FIG. 10. In the case of the variant shown in FIG. 12 however, several annular permanent magnets 100 are arranged around the compression chamber 16. These permanent magnets 100 interact with a permanent magnet 102 in the compressor component 18. The arrangement and polarity of the permanent magnets 100 can in the process be selected such that the movement of the compressor component 18 is supported in radial direction 34 either radially inward or radially outward.

Figure 13:
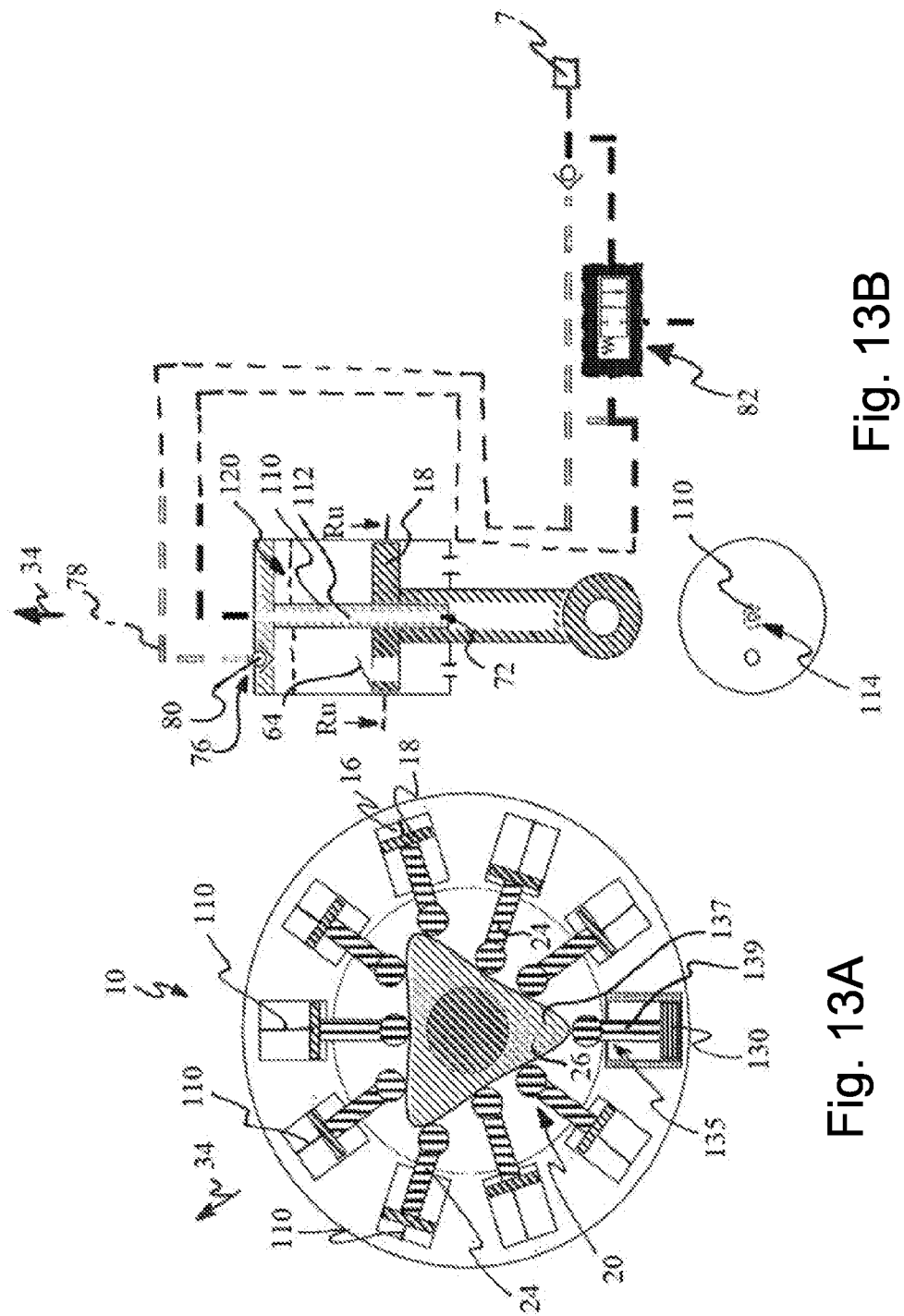
FIGS. 13A and 13B show a further embodiment and individual areas in detail.

FIG. 13A schematically shows a further embodiment (similar to the one from FIG. 5 with regard to the transmission parts 24, 26) of a compressor assembly in accordance with the invention 10. At the top right a compression chamber 16 with compressor component 18 and hub-side transmission part 24 is shown in detail. At the bottom right the compressor component is shown in section along the line RU-RU.

In the case of the compressor components 18 this compressor assembly 10 comprises in each case a rod-type guide element 110, which extends into the compressor component 18.

Such a compressor component 18 is shown in FIG. 13B. The pressure medium inlet 72 is in the process arranged on the rod-type guide element 110. The pressure medium inlet 72 flows to the pressure chamber 75, which is currently designed separate from the compression chamber 16. Thus, there is no pneumatic connection between the pressure chamber 75 and the compression chamber 16.

If the pressure chamber 75 is exposed to pressure medium, the compressor component 16 moves down (FIG. 13B) or radially inward (FIG. 13A). As a result, the hub-side transmission part 24 can be brought into contact with the wheel carrier side transmission part 26. If the pressure chamber 75 is not relieved from pressure via the relief valve 82 (thus, remains filled with pressure medium that is under pressure), the pressure chamber 75 acts as a pneumatic spring. In the delivery stroke the pressure medium in the pressure chamber 75 is compressed. When the compressor component 18 reaches its upper dead center, through the pressure in the pressure chamber 25 the intake stroke is initiated or the pressure in the pressure chamber 25 ensures that the hub-side transmission part 24 remains in contact with the wheel carrier side transmission part 26. If the operation of the compressor assembly 10 is to be ceased, the pressure chamber 25 can be relieved from pressure via the relief valve 82.

A line section 112 runs in the rod-type guide element 110, said line section flowing into the pressure medium inlet 72. The guide element 110 in FIG. 13B forms a part of the limitation of the pressure chamber 75. In FIG. 13B the line section 78 and the pressure chamber 75 can be relieved from pressure or can be drained via a common control valve.

As shown in FIG. 13B the guide element 110 forms an anti-locking device 114 for the compressor component 18, wherein the guide element 110 has an out of round, here virtually oval cross-section.

A dead space volume in FIG. 13B bears the reference numeral 120 and is represented symbolically by a broken line.

The compressor assembly 10 in FIG. 13A comprises a translator 130 of a generator assembly 140. The generator assembly 140 generates electrical energy through oscillating translational movement of the translator 140. The compressor assembly 10 comprises in the process a generator transmission 135, which is designed to convert a rotational motion between the wheel carrier side and the wheel hub side into an oscillating translational movement of the translator 130 when a wheel carrier side generator transmission part 137 (here identical to the wheel carrier side transmission part 26) is in an operating position with a hub-side generator transmission part 139. The generator transmission 135 here can be actuated independently from the transmission 20. The transmission 20 and the generator transmission 135 here are virtually identical in design. Thus, the translator 130 can fulfill a dual function as a compressor component 18.

Figure 14:
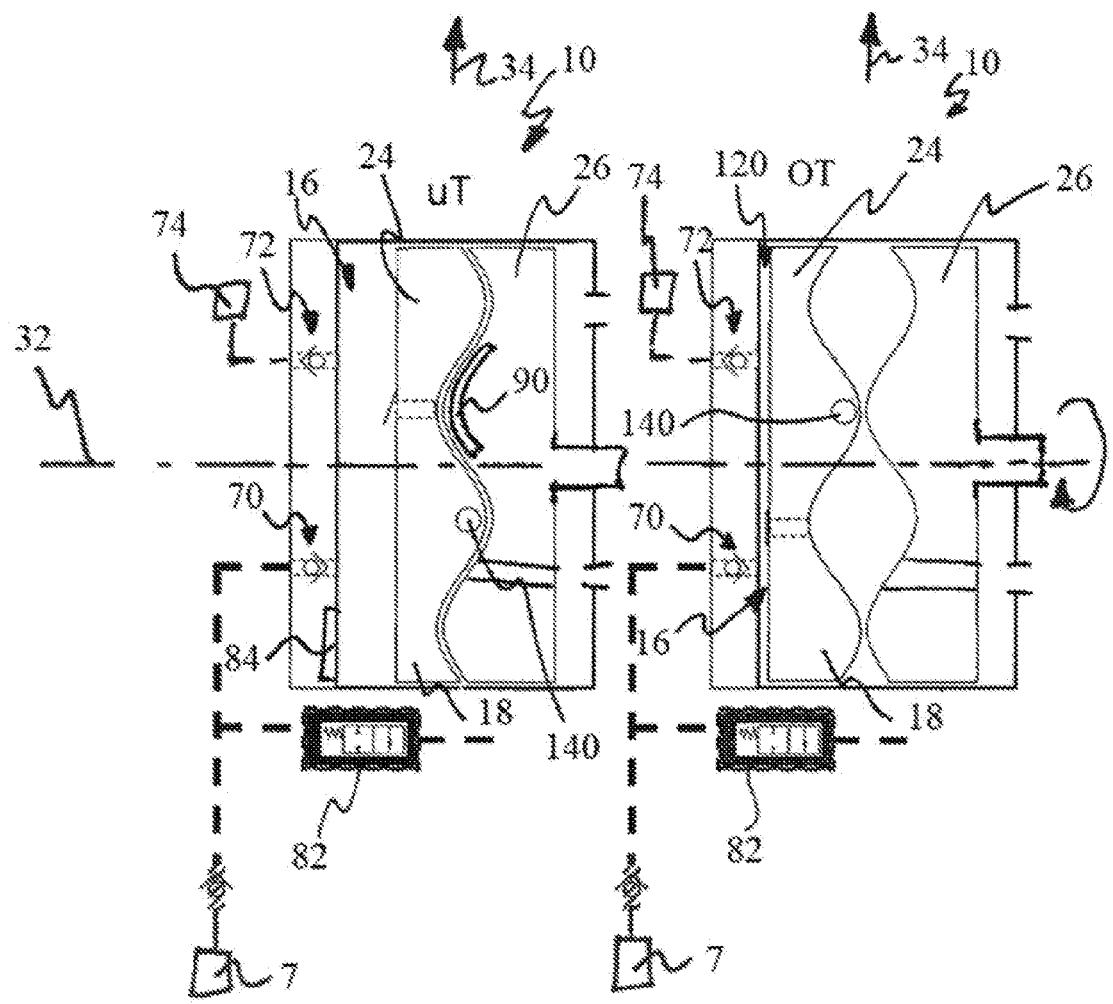
FIG. 14 shows a further embodiment with axially moving compressor component.

In the case of the embodiment shown in FIG. 14 the compressor component 18 moves in axial direction, thus in the direction of the axis of rotation 32. FIG. 14 shows in the process a section through the housing or the limitation of the compression chamber 16 along a plane extending in radial direction 34.

Figure 16:
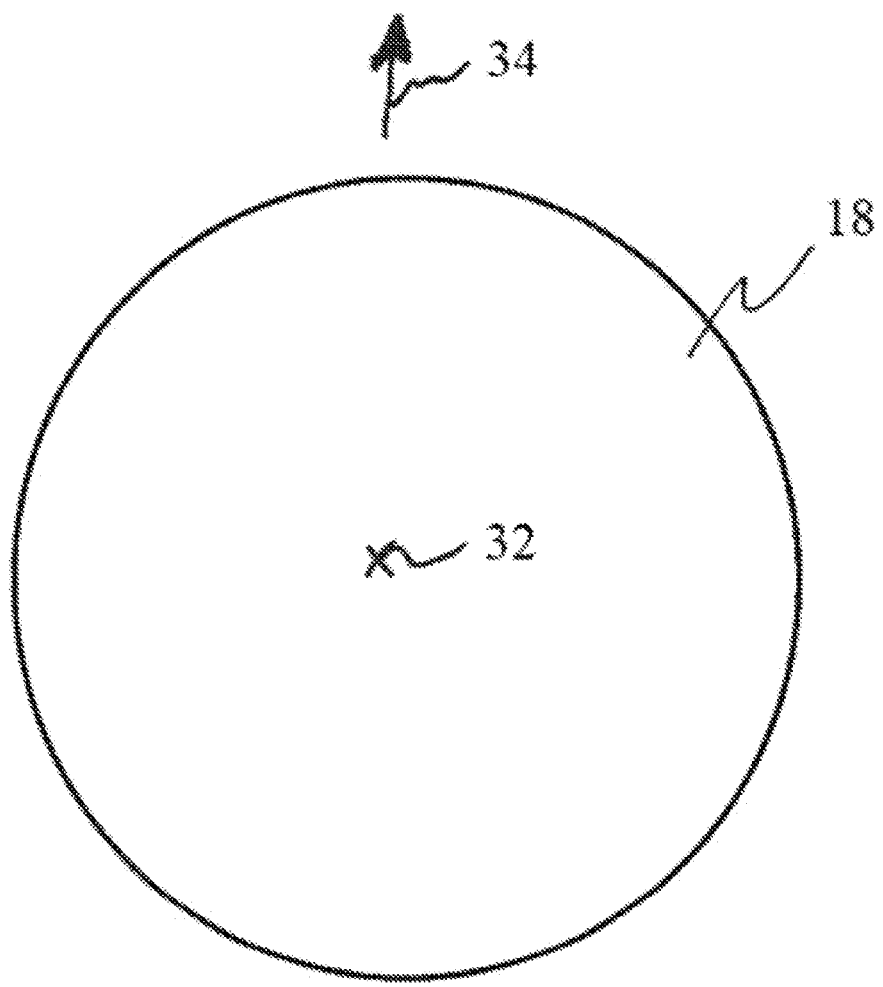
FIG. 16 shows a top view of the side of the compressor component of the compressor assembly from FIG. 14 averted from the wheel carrier side transmission part.

The hub-side transmission part 24 or compressor component 18 and wheel carrier side transmission part 26 have a circular cross-section when viewed along the axis of rotation 32 (see FIG. 16).

FIG. 14 shows a compressor assembly 10 in two operating states. On the left, the plate-like configured compressor component 18, which simultaneously forms the hub-side transmission part 24, is shown in a lower dead center UT and on the right is shown in the upper dead center OT. The wheel carrier side transmission part 26 rotates toward the hub-side transmission part 24. A tappet 140 prevents the hub-side transmission part 24 from rotating with the wheel carrier side transmission part 6 20. The tappet 140 is connected to the housing (only schematically represented) of the compressor assembly 10.

Figure 15:
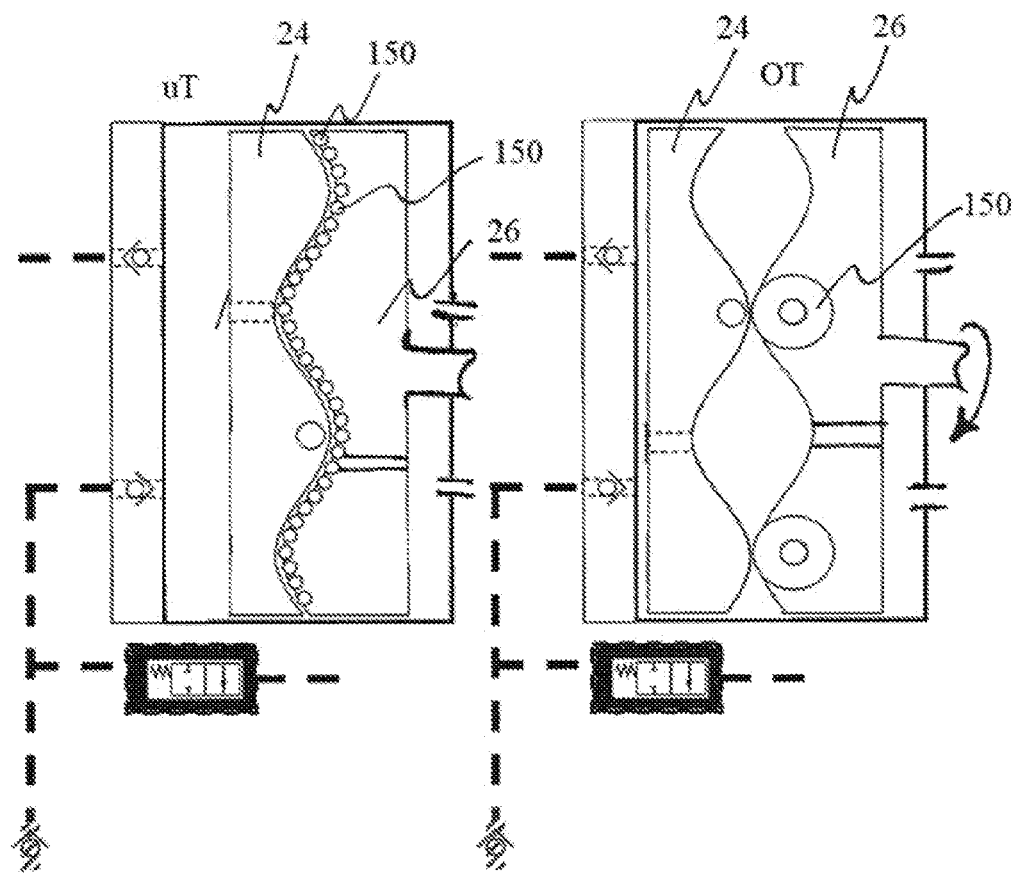
FIG. 15 shows a further embodiment with axially moving compressor component, similar to FIG. 14.

FIG. 15 shows alternative embodiments of the compressor assembly 10 from FIG. 14.

In the embodiments shown in FIG. 15 rollers 150 are arranged in the contact region between the hub-side transmission part 24 and the wheel carrier side transmission part 26. The rollers 150 can in the process be arranged on the hub-side transmission part 24 or on the wheel carrier side transmission part 26, as shown in FIG. 15.

FIG. 16 shows a top view of the side of the compressor component 18 of the compressor assembly 10 averted from the wheel carrier side transmission part 26 from FIG. 14 viewed along the axis of rotation 32.

Figure 17:
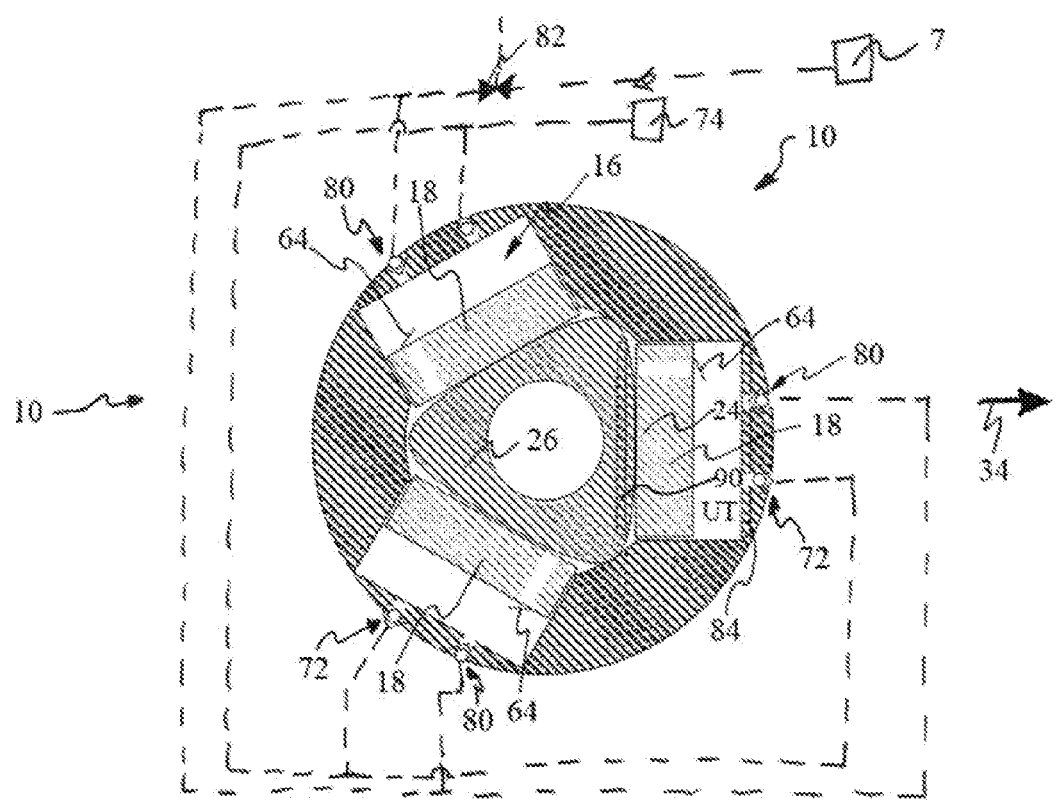
FIG. 17 shows a further embodiment of a compressor assembly in accordance with the invention.
Figure 18:
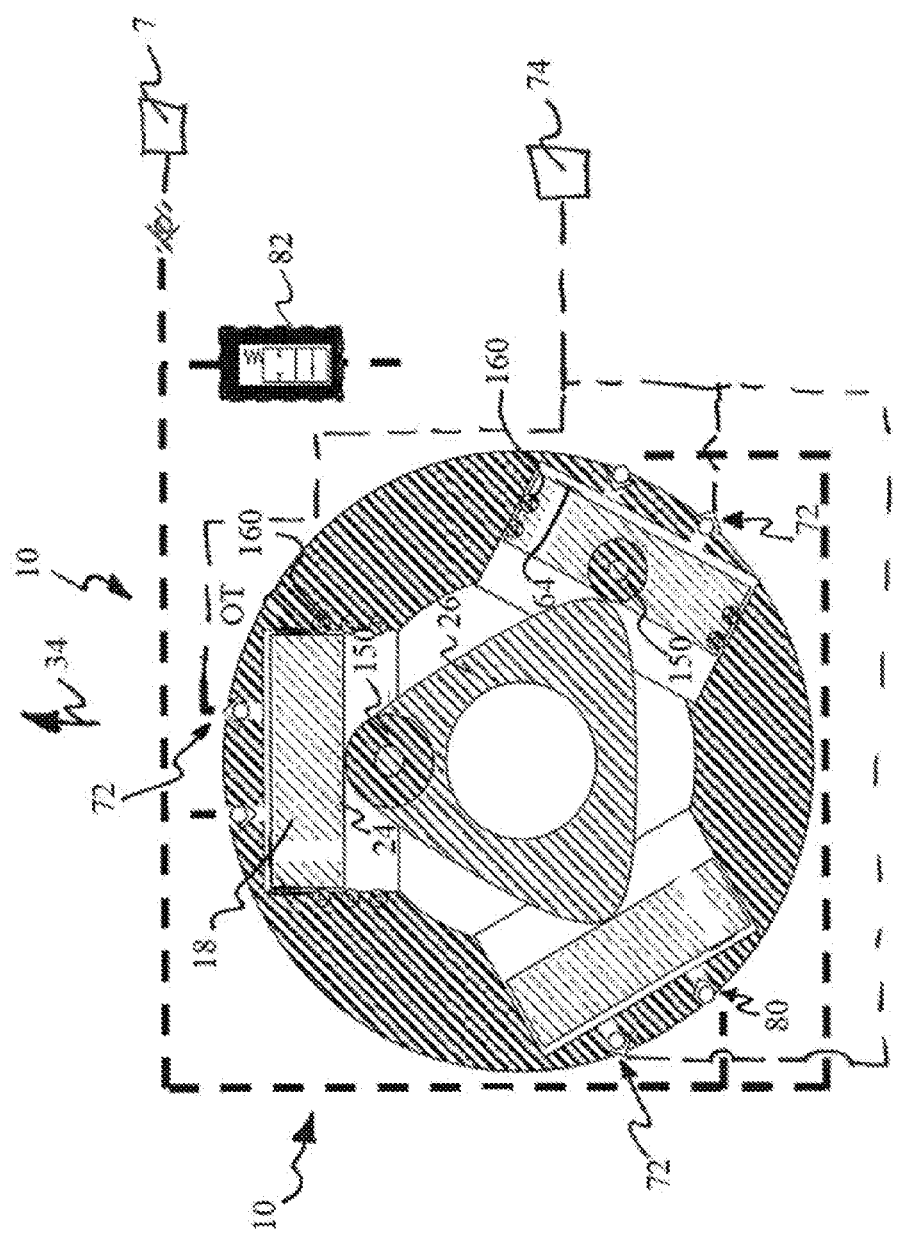
FIG. 18 shows a further embodiment of a compressor assembly in accordance with the invention.

FIGS. 17 and 18 show further embodiments of compressor assemblies 10 in accordance with the invention.

The embodiments shown in FIGS. 17 and 18 have plate-like configured compressor components 18, which in the operation of the compressor assembly 10 move in an oscillating translational manner in radial direction 34.

The compressor assembly 10 from FIG. 17 has permanent magnets 90 in the wheel carrier side transmission part 26 (only one is shown in the figure), which are configured to hold the hub-side transmission parts 24 in an operating position with the wheel carrier side transmission part 26, therefore they constitute a coupling device 41.

A permanent magnet 84 is likewise arranged in the cover section of the compression chamber 16, which is configured to be stronger than the permanent magnets 90. In the operation of the compressor assembly 10 the pressure medium in the compression chamber 16 acts as a pneumatic spring (the compression chamber 16 forms a pressure chamber 25), which prevents the compressor component 18 from adhering to the permanent magnets 84. To stop the operation of the compressor assembly 10, the compression chamber 16 or the compression chambers 16 are relieved from pressure via the valve 82. The compressor component 18 then adheres to the permanent magnet 84 and disengages from the wheel carrier side transmission part 26.

The compressor assembly 10 from FIG. 18 is similar in design to the compressor assembly 10 from FIG. 17. However, the compressor assembly 10 of FIG. 18 has rollers 150 arranged in the contact region between the wheel carrier side transmission part 26 and the hub-side transmission part 24, and the compressor assembly 10 of FIG. 18 also has rollers 160 arranged in the contact region between the compressor component 18 and the circumferential wall of the compression chamber 16. In the process the rollers 160 are arranged on the wall of the compression chamber 16 (lower right) and on the wall of the compressor component 18 (upper center).

In the case of all the embodiments the compressor component 18 has a circumferential seal that seals it from the wall of the compression chamber 16.

Figure 19:
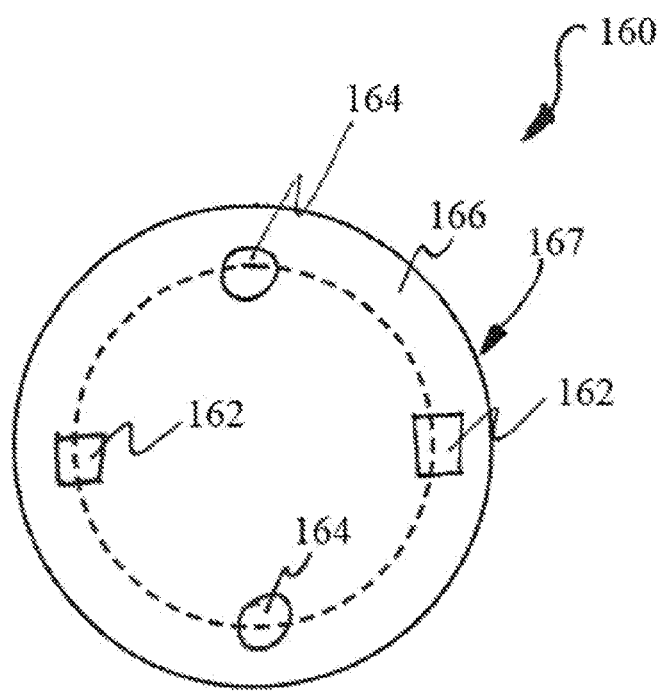
FIG. 19 shows a part of a switchable magnet assembly.

FIG. 19 shows a part of a switchable magnet assembly 160 in which a formation 161 of permanent magnets 162, 164 is arranged on a circular disk-shaped plate 166. Two permanent magnets 162 of a first polarity type are arranged offset by 90° to two permanent magnets 164 of a second polarity type arranged.

FIGS. 20A and 20C show the two formations 161 of permanent magnets 162, 164 arranged on the circular disk-shaped plates 166 on top of one another in a lateral view. In FIG. 20B a rotary movement 170 from the configuration shown in FIG. 20A to the configuration shown in FIG. 20B is represented by an arrow. The rotary movement 170 in the process relates to the upper disk-shaped plate 166.

In the FIG. 20A configuration, the formations 161 of permanent magnets 162, 164 repel each other, which is represented by the double arrows 180. In the FIG. 20C configuration the formations 161 of permanent magnets 162, 164 attract each other, which is represented by the double arrows with the reference numeral 190.

Such a switchable magnet assembly 160 can be used to realize a switchable magnet based decoupling device 39 and/or to realize a switchable magnet-based coupling device 41. For example, to this end a formation 161 of permanent magnets 162, 164 can be arranged in the compressor component 18 and a second pivoted formation 161 of permanent magnets 162, 164 can be arranged in the cover section of the compression chamber 16. Via a control pulse the second pivoted formation 161 of permanent magnets 162, 164 can be rotated in the cover section by 90° and hence can be switched from the attracting effect to the repellent effect or vice versa.

A similar configuration is possible in the wall of the compression chamber 16 opposite the cover section.

The invention claimed is:

1. A compressor assembly (10) for supplying pressure medium to a tire cavity (7) of a tire of a vehicle wheel, the vehicle wheel configured to be mounted on a wheel hub (4), which is mounted on a wheel carrier (3) for rotation about an axis of rotation (32), the compressor assembly (10) comprising:
 a hub-side compression chamber (16) in combination with a compressor component (18), wherein a pressure medium to be conducted into the tire cavity (7) is pressurized in the compression chamber (16) by oscillating translational movement of the compressor component (18) within the compression chamber (16), wherein the compressor component (18) includes a ferromagnetic material or a permanent magnet (102) arranged in the compressor component (18),
 a transmission (20) configured to convert a rotational motion between a wheel carrier side and a wheel hub side into an oscillating translational motion of the compressor component (18) when a hub-side transmission part (24) is in an operating position with a wheel carrier side transmission part (26), wherein the compressor component (18) is rigidly connected to the hub-side transmission part (24), and
 at least one permanent magnet (100) arranged in a circumferential wall of the compression chamber (16).

2. The compressor assembly (10) according to claim 1, wherein the compression chamber (16) includes a pressure medium outlet (76) connected to a dead space volume (120) of the compression chamber (16), wherein the pressure medium outlet is connected to the tire cavity (7) via a line section (78), and wherein the line section (78) is connected to a relief valve (82), via which the line section (78) can be relieved from pressure.

3. The compressor assembly (10) according to claim 1, further comprising a pressure chamber (25) with a pressure medium inlet (72), wherein the compressor component (18) forms a part of a limitation of the pressure chamber such that the compressor component (18) is moved by supplying a pressure surge to the pressure chamber (25).

4. The compressor assembly (10) according to claim 3, wherein the pressure chamber (25) is the compression chamber (16).

5. The compressor assembly (10) according to claim 3, wherein the pressure chamber (25) is configured pneumatically separate from the compression chamber (16), wherein the pressure chamber (25) is arranged in the compressor component (18) and/or in the hub-side transmission part (24).

6. The compressor assembly (10) according to claim 1, further comprising
 a translator (130) of a generator assembly (140), wherein the generator assembly (140) generates electrical energy by oscillating translational movement of the translator (130), and
 a generator transmission (135) configured to convert a rotational motion between the wheel carrier side and the wheel hub side into an oscillating translational movement of the translator (130) when a wheel carrier side generator transmission part (137) is in an operating position with a hub-side generator transmission part (139), wherein the generator transmission (135) can be actuated independently from the transmission (20).

7. The compressor assembly (10) according to claim 1, wherein the compressor component (18) is configured as being connected in one piece to the hub-side transmission part (24).

8. The compressor assembly (10) according to claim 1, wherein the compressor component (18) is configured and arranged to deliver pressure medium during operation of the compressor assembly (10) by a radially inward movement and a radially outward movement.

9. The compressor assembly (10) according to claim 3, further comprising a flutter valve (64) arranged on the compressor component (18) or on the limitation of the compression chamber (16) such that the flutter valve is configured to open in an intake stroke of the compressor component (18) and close in a delivery stroke of the compressor component (18).

10. The compressor assembly (10) according to claim 1, wherein the wheel carrier side transmission part (26) comprises a disk groove curve (44), with a switch point section (46) and with a working path (48) and a freewheel path (50), which are connected via the switch point section (46).

11. The compressor assembly (10) according to claim 1, wherein the compressor component (18) is configured as a dual piston.

12. The compressor assembly (10) according to claim 1, wherein the at least one permanent magnet (100) interacts with the ferromagnetic material or the permanent magnet (102) in the compressor component (18), wherein an arrangement and a polarity of the at least one permanent magnet (100) is configured to support the movement of the compressor component (18) in a radial direction (34) within the compression chamber (16).

* * * * *